(12) United States Patent
Deck et al.

(10) Patent No.: US 10,983,050 B2
(45) Date of Patent: Apr. 20, 2021

(54) DIFFUSE REFLECTANCE APPARATUS

(71) Applicant: THERMO ELECTRON SCIENTIFIC INSTRUMENTS LLC, Madison, WI (US)

(72) Inventors: Francis J. Deck, Madison, WI (US); Ning Ning Pan, Bremen (DE)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

(21) Appl. No.: 16/523,513

(22) Filed: Jul. 26, 2019

(65) Prior Publication Data

US 2020/0033263 A1  Jan. 30, 2020

Related U.S. Application Data

(60) Provisional application No. 62/711,830, filed on Jul. 30, 2018.

(51) Int. Cl.
*G01N 21/47* (2006.01)
*G01J 3/02* (2006.01)
*G01N 21/35* (2014.01)

(52) U.S. Cl.
CPC .......... *G01N 21/4738* (2013.01); *G01J 3/021* (2013.01); *G01N 2021/3595* (2013.01)

(58) Field of Classification Search
CPC ............ G01J 3/021; G01N 2021/3595; G01N 21/4738; G01N 2021/4752; G01N 2021/4761; G01N 21/359; G01N 21/474; H01R 11/01; H01R 11/09; H01R 13/02; H01R 13/04; H01R 13/10; H01R 13/24; H01R 13/502; H01R 13/52; H01R 13/631; H01R 13/658; H01R 24/00

USPC ..... 356/432–448, 237.1–237.6, 239.1–239.8
See application file for complete search history.

(56) References Cited

U.S. PATENT DOCUMENTS

| | | | |
|---|---|---|---|
| 4,078,858 A | 3/1978 | Mast | |
| 4,453,180 A * | 6/1984 | Juergensen | H04N 1/488 |
| | | | 358/510 |
| 4,661,706 A | 4/1987 | Messerschmidt et al. | |
| 5,734,587 A | 3/1998 | Backhaus et al. | |
| 6,667,808 B2 | 12/2003 | Clermont et al. | |
| 9,976,949 B2 | 5/2018 | Carter et al. | |
| 2007/0229833 A1 | 10/2007 | Rosencwaig et al. | |

(Continued)

FOREIGN PATENT DOCUMENTS

| | | |
|---|---|---|
| DE | 102010061767 A1 | 5/2012 |
| EP | 2693197 A1 | 2/2014 |
| JP | S63298138 A | 12/1988 |

OTHER PUBLICATIONS

PCT/US2019/043688, Search Report and Written Opinion, dated Oct. 16, 2019.

*Primary Examiner* — Tri T Ton
(74) *Attorney, Agent, or Firm* — William R. McCarthy, III

(57) ABSTRACT

A diffuse reflectance apparatus includes a housing having a window formed therein, and a diffuse reflectance mirror spaced from the window and having an aperture extending therethrough. A light source provides a beam of light. A first mirror assembly is positioned to reflect the beam of light through the aperture such that it passes through the window. A second mirror assembly is positioned to reflect scattered light from the concave mirror to a detector.

19 Claims, 5 Drawing Sheets

(56) References Cited

U.S. PATENT DOCUMENTS

2012/0008140 A1* 1/2012 Khan ...................... G01J 3/42
356/326

* cited by examiner

DIFFUSE REFLECTANCE APPARATUS

CROSS-REFERENCE TO RELATED APPLICATIONS

The present application is a claims the priority benefit of U.S. Patent Application Ser. No. 62/711,830, filed Jul. 30, 2018. The disclosures of the foregoing application is incorporated herein by reference.

FIELD OF THE INVENTION

Aspects of this invention relate generally to a diffuse reflectance apparatus for using dark-field illumination to collect scattered light from a sample, and more particularly, to a diffuse reflectance apparatus that includes a mirror having an aperture extending therethough.

BACKGROUND OF THE INVENTION

Diffuse reflectance is a useful method for measuring the chemical spectra of materials in a spectrometer, such as a Fourier transform infrared (FT-IR) spectrometer. The main mechanism for producing such a spectrum is that some of the illumination light passes through a portion of the sample material before being scattered back out, thus the light is affected by the absorbance of the sample at wavelengths of interest for the measurement. Diffuse reflectance can thus be considered a misnomer, but it is a term that is widely used in the industry. The diffuse reflectance measurement is an absorbance measurement, and one that provides information about the chemical composition of the sample, such as the concentration of chemical compounds within the sample, including moisture and impurities.

The diffuse reflectance measurement has a number of benefits: The portion of the sample that produces the spectrum is typically fairly thin, thus the spectrum is not affected by fully absorbing peaks. Preparation of the sample is simplified because the sample does not have to be thinned or diluted, and can often be left in a container such as a glass vial, a bottle, or a cup. Very large samples can be accommodated without interfering with the design or size of the spectrometer. This includes sample cups that are spun on an axis to allow averaging over a portion of a sample.

When diffuse reflectance is used in a typical chemical analysis application, it is desirable for the measurement to be a function of the bulk chemical properties of the sample—at least of the portion of the sample near its surface—and not of purely optical properties such as specular reflection from the sample surface and from its container. A dark-field reflectance measurement can satisfy this criterion. Dark-field reflectance measurement is used to refer to illumination and collection that do not share the same solid angle space, so that specular reflected light is not collected.

A prior art apparatus for diffuse reflectance in a spectrometer, such as a FT-IR spectrometer, may include an integrating sphere. However, integrating spheres can be cumbersome and expensive.

It would be desirable to provide a diffuse reflectance apparatus that reduces or overcomes some or all of the difficulties inherent in prior known processes. Particular objects and advantages will be apparent to those skilled in the art, that is, those who are knowledgeable or experienced in this field of technology, in view of the following disclosure and detailed description of certain embodiments.

SUMMARY

In accordance with a first aspect, a diffuse reflectance apparatus includes a housing having a window formed therein, and a diffuse reflectance mirror spaced from the window and having an aperture extending therethrough. A light source provides a beam of light. A first mirror assembly is positioned to reflect the beam of light through the aperture such that it passes through the window. A second mirror assembly is positioned to reflect scattered light from the concave mirror to a detector.

In accordance with another aspect, a diffuse reflectance apparatus includes a housing having a window formed therein. A concave diffuse reflectance mirror is spaced from the window and has an aperture extending therethrough. A light source provides a beam of light, and a first mirror assembly is positioned to reflect the beam of light through the aperture such that it passes through the window. A baffle is positioned between the first mirror assembly and the concave diffuse reflectance mirror. A second mirror assembly is positioned to reflect scattered light from the concave mirror to a detector.

In accordance with other aspects, a diffuse reflectance apparatus includes a housing having a window formed therein. A concave ellipsoidal diffuse reflectance mirror is spaced from the window and has an aperture extending therethrough. A light source provides a beam of light, and a first mirror assembly is positioned to reflect the beam of light through the aperture such that it passes through the window. The first mirror assembly includes a concave parabolic mirror; and a flat mirror. A baffle is positioned between the first mirror assembly and the concave ellipsoidal diffuse reflectance mirror. A second mirror assembly is positioned to reflect scattered light from the concave mirror to a detector. The second mirror assembly includes a first flat mirror, a second flat mirror, and a concave ellipsoidal mirror.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
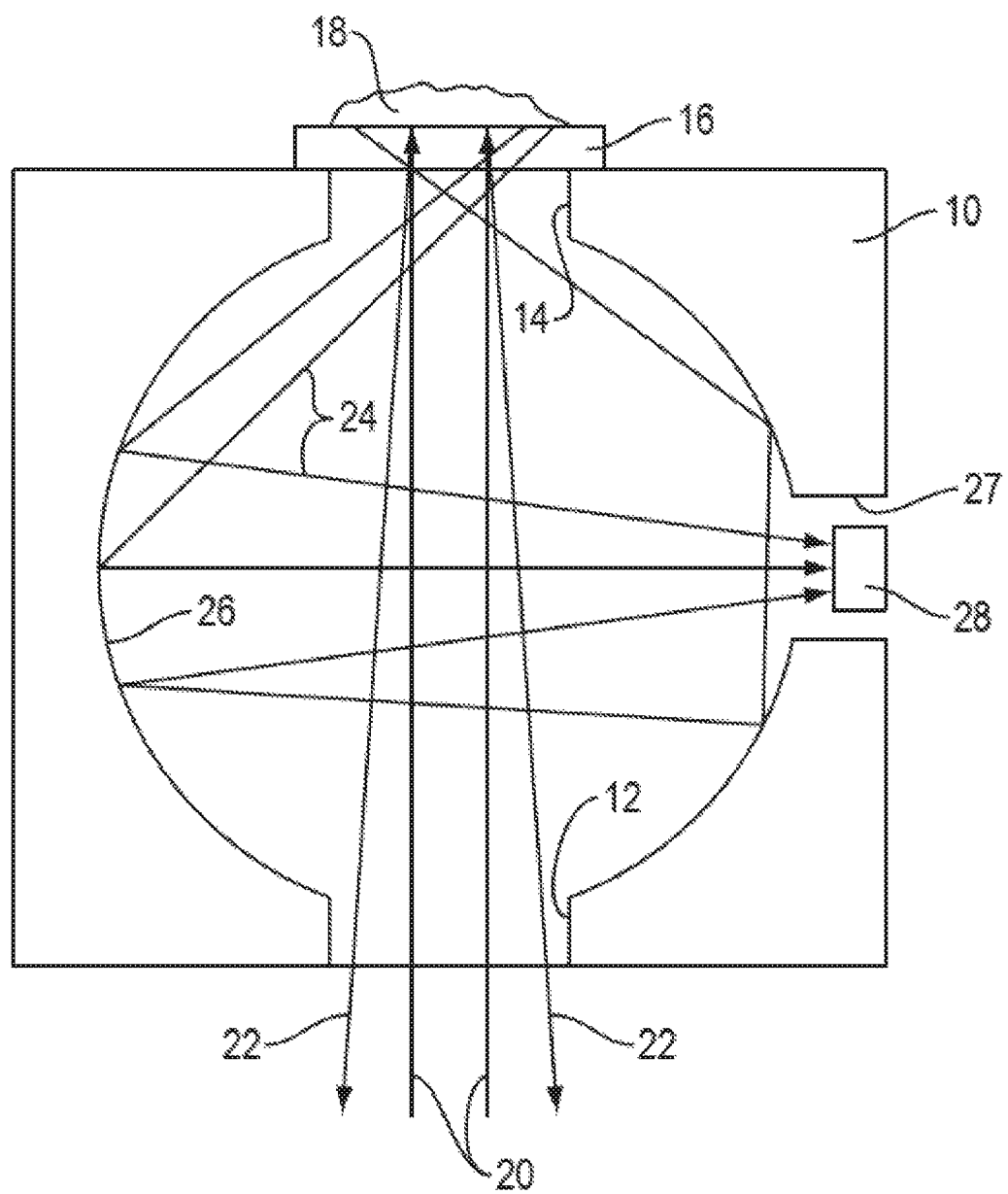
FIG. 1 is a schematic view of a prior art integrating sphere for use with a spectrometer.

The figures referred to above are not drawn necessarily to scale, should be understood to provide a representation of particular embodiments of the invention, and are merely conceptual in nature and illustrative of the principles involved. Some features of the diffuse reflectance apparatus depicted in the drawings have been enlarged or distorted relative to others to facilitate explanation and understanding. The same reference numbers are used in the drawings for similar or identical components and features shown in various alternative embodiments. Diffuse reflectance apparatuses as disclosed herein would have configurations and components determined, in part, by the intended application and environment in which they are used.

DETAILED DESCRIPTION OF EMBODIMENTS

FIG. 1 illustrates a representative prior art diffuse reflectance apparatus. An integrating sphere 10 includes a first aperture 12 and an opposed second aperture 14. It is to be appreciated that integrating sphere 10 is so named because of its generally spherical interior surface. As shown here, the exterior surface of integrating sphere 10 has the shape of a cube. It is to be appreciated that the exterior surface of integrating sphere 10 can take any shape.

A window 16 in a housing (not shown) is positioned above second aperture 14, and a sample 18 to be tested is positioned above window 16. Window 16 serves to support sample 18 and/or hold it in position. It is to be appreciated that window 16 may represent the bottom of a vial, cup, or other container in which sample 18 is received.

A beam of light 20, whose range of wavelengths is of interest to chemical spectroscopy, is projected through first aperture 12 and second aperture 14, and brought to a focus at sample 18. As light 20 passes through integrating sphere 10, some of the light is specularly reflected by the surfaces of first and second apertures 12, 14, and by the surface of sample 18 itself. The sizes of first aperture 12 and second aperture 14 are selected such that a substantial portion of this specularly reflected light 22 passes back through both first aperture 12 and second aperture 14, and does not fall on the inside surface of integrating sphere 10.

If sample 18 is translucent at the wavelengths of interest for chemical analysis, some light will be scattered within sample 18, and will emerge in a wider range of exit angles than the angular range of the incident beam of light 20. This scattered light 24 is collected by an interior surface 26 of integrating sphere 10, which is arranged to be a specularly reflective material. Interior surface 26 reflects a portion of the scattered light through a third aperture 27 in integrating sphere 10 and reaches detector 28.

There are two notable disadvantages with the use of integrating sphere 10. Initially, it is to be appreciated that integrating sphere 10 tends to be bulky and expensive. The interior of integrating sphere 10 must be coated with a material that is diffusely reflective, yet of very high reflectivity. Only a few materials are known to be suitable for this coating such as pure gold, magnesium oxide, and a commercial material called Spectralon® provided by Labsphere, Inc. Additionally, the efficiency of the sphere is low due to residual absorption of light by interior surface 26 of integrating sphere 10, resulting in a loss of signal-to-noise ratio for detector 28.

Figure 2:
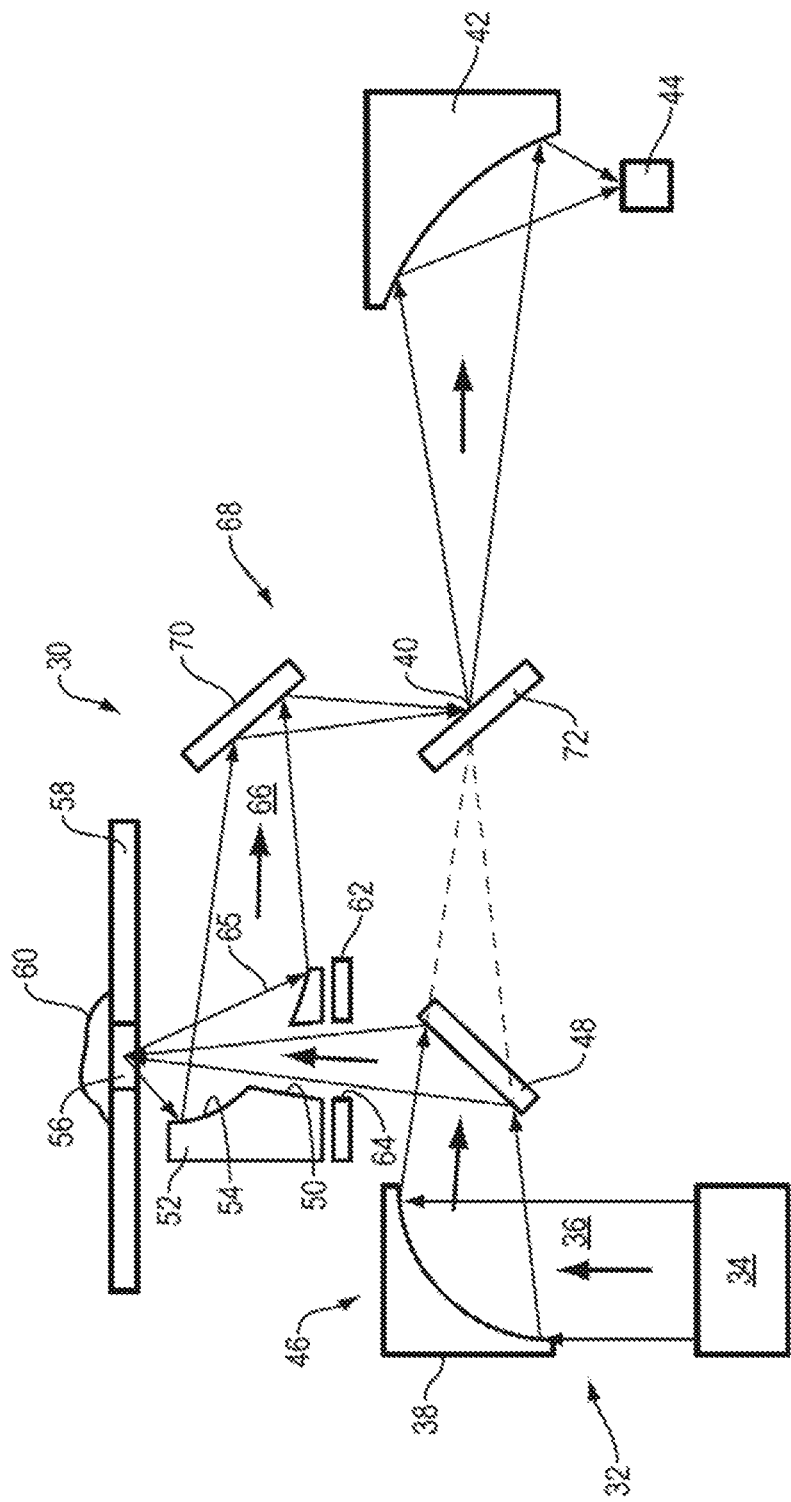
FIG. 2 is a schematic view of a diffuse reflectance mirror in use with a spectrometer.

A schematic illustrative example of a diffuse reflectance apparatus 30 for use with a spectrometer 32, such as an FT-IR spectrometer, is seen in FIG. 2. If diffuse reflectance apparatus 30 is used with an FT-IR spectrometer, then the spectrometer can measure the transmission or absorption spectrum of a sample. It is to be appreciated that a diffuse reflectance apparatus 30 as disclosed herein can be used with other spectrometers, including, for example, a dispersive NIR spectrometer, a mid-IR spectrometer, and a visible spectrometer.

Spectrometer 32 includes a light source 34 that provides a collimated light beam 36 that is incident on a concave parabolic mirror 38. If spectrometer 32 were used without diffuse reflectance apparatus 30, light beam 36 would be reflected by concave parabolic mirror 38 such that light beam 36 be brought to a focus at focal point 40 (illustrated with dashed lines), where a sample would be positioned. Light beam 36 would then diverge from focal point 40, and would then be incident on a concave ellipsoidal mirror 42. Mirror 42 would refocus and reflect the beam, which would then be incident on a detector 44. If beam 36 and detector 44 are part of an FT-IR spectrometer, then the spectrometer would measure the transmission or absorption spectrum of the sample at focal point 40.

In use, diffuse reflectance apparatus 30 is inserted into the light beam 36 as seen in FIG. 2. A first mirror assembly 46 includes concave parabolic mirror 38 and a flat mirror 48. Light beam 36 is redirected by concave parabolic mirror 38 and flat mirror 48 through an aperture 50 formed in and extending through a diffuse reflectance mirror 52.

In the illustrated embodiment, diffuse reflectance mirror 52 is a concave mirror. In certain embodiments, diffuse reflectance mirror 52 could be a concave ellipsoidal mirror.

In certain embodiments a reflective surface 54 of diffuse reflectance mirror 52 is made of diamond turned polished aluminum. In other embodiments, reflective surface 54 of diffuse reflectance mirror 52 can be made of a less expensive material, such as plastic. Other suitable materials for reflective surface 54 of diffuse reflectance mirror 52 will become readily apparent to those skilled in the art, given the benefit of this disclosure.

The light pasting through aperture 50 of diffuse reflectance mirror 52 passes through a window 56 formed in a housing 58 and strikes a sample 60 seated on window 56. Specular light reflected from sample 60 and from window 56 is directed back through aperture 50. Thus, it is to be appreciated that the size of aperture 50 is designed to accept all of the specularly reflected light.

The term "approximately" as used herein is meant to mean close to, or about a particular value, within the constraints of sensible, commercial engineering objectives, costs, manufacturing tolerances, and capabilities in the field of diffuse reflectance apparatus manufacturing and use.

In certain embodiments, a baffle 62 with an aperture 64 extending therethrough is positioned between flat mirror 48 and diffuse reflectance mirror 52. Baffle 62 serves to control the diameter of light beam 36, thereby reducing the chance of light beam 36 striking housing 58. If such stray light were to reflect off housing 58, some of it would scatter and be directed to detector 44, providing a false reading. In similar fashion, baffle 62 serves to reduce the chance of light beam 36 striking the wall of aperture 50, which would also cause stray reflections.

Suitable materials for baffle 62 will become readily apparent to those skilled in the art, given the benefit of this disclosure.

Figure 3:
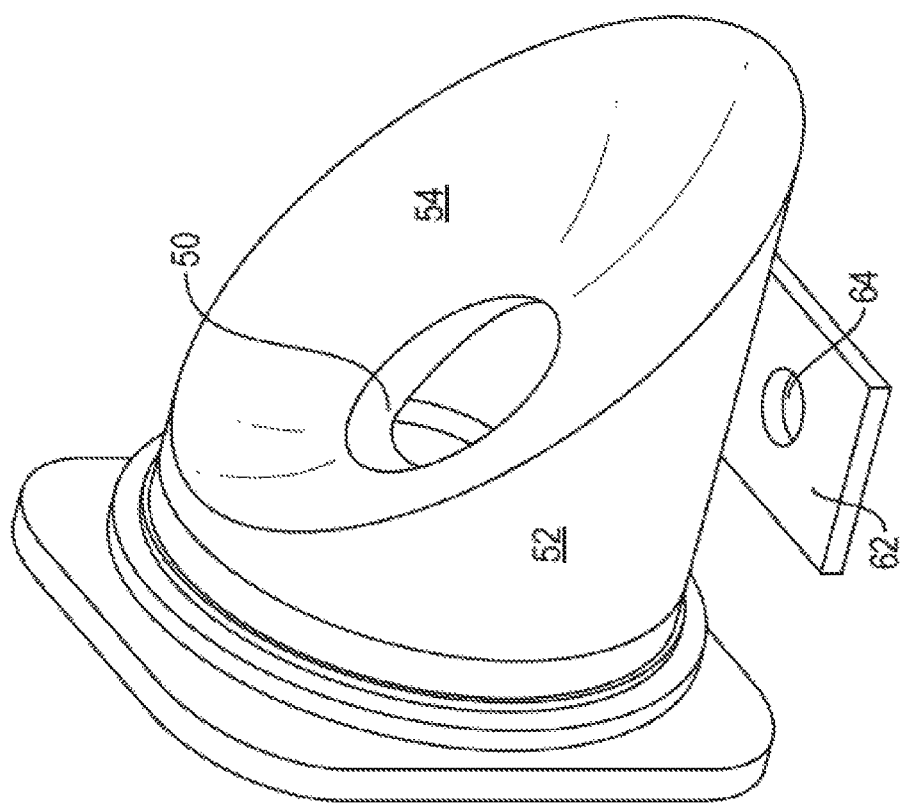
FIG. 3 is a perspective view of the diffuse reflectance mirror and baffle of FIG. 2.

Diffuse reflectance mirror 52 and baffle 62 are seen in a perspective view in FIG. 3.

Scattered light 65 reflecting from sample 60 strikes and is collected by reflective surface 54 of diffuse reflectance mirror 52, forming a converging light beam 66 which is directed to a second mirror assembly 68. Light beam 66 is reflected by a first flat mirror 70 of second mirror assembly 68 to a second flat mirror 72 of second mirror assembly.

It is to be appreciated that some of the scattered light 65 may be reflected from the surface of aperture 50. Accordingly, in some embodiments, the surface of aperture 50 may be painted matte black in order to reduce reflectance off the surface.

It is also to be appreciated that housing 58 having window 56 should be positioned such that its surface is close to perpendicular to light beam 36 passing through window 56, in order to minimize the amount of stray light that reaches detector 44. In certain embodiments, the tilt tolerance of housing 58 with respect to light beam 36 may be within +/−approximately 2 degrees.

Light beam 66 is reflected by second flat mirror 72 and directed to concave ellipsoidal mirror 42, which in turn reflects light beam 66 to detector 44. It is to be appreciated that the distance between first flat mirror 70 and second flat mirror 72 is selected such that the focus of light beam 66 is coincident with focal point 40 in order that the light is brought to a focus at detector 44.

It is to be appreciated that increasing the size of aperture 50 in diffuse reflectance mirror 52 will provide higher incident light energy while at the same time lowering the scattering light energy that is reflected by the incident light. Accordingly, in certain embodiments a balance between the size of aperture 50 and the light energy that strikes detector 44 can be realized by controlling both the size of aperture 50 and the size of aperture 64 in baffle 62. In certain embodiments, the Diameter of Aperture 64=Diameter of Aperture 50+2.

It is to be appreciated that diffuse reflectance apparatus 30 should interrogate a large enough portion of sample 60 to make a measurement that represents an average over the distribution of chemical components in sample 60. Naturally, this criterion is guaranteed for homogeneous samples, while the distribution of the components across inhomogeneous samples varies. For example, pharmaceutical tablets tend to be mixtures of small crystals, typically, on the order of 20 to 200 microns across. Therefore, a detecting instrument that "sees" an analytical spot diameter of 1 mm will collect a representative average spectrum on such a pharmaceutical tablet.

However, it is to be appreciated that the analytical spot diameter should not be larger than a typical sample. In an embodiment measuring the composition of a pharmaceutical tablet of approximately 5 mm in diameter or larger, the analytical spot should not be larger than 5 mm Thus an analytical spot diameter may be in the range of approximately 1 mm to approximately 5 mm for such a tablet.

The analytical spot should be uniformly illuminated, which can be achieved by forming an illumination spot that is larger than the analytical spot. But illumination of an area outside of the analytical spot is wasted, so the illumination spot size should not exceed the analytical spot size by a great amount. Preferably, the two should be within a factor of approximately 2 to 10 of one another. Varying the size of aperture 64 in baffle 62 will vary the size of the illumination spot.

It is to be appreciated that a law of optics sets a relationship between spot size and the numerical aperture subtended by a beam. These tend to be inversely proportional to one another. Thus, the smaller analytical spot size of the detection beam at sample 60 should correspond to a large numerical aperture, whereas the larger spot size of the illumination beam should correspond to a smaller numerical aperture.

Thus it is preferable that the illumination beam, being of smaller numerical aperture, be admitted inside the detection beam. The preferred arrangement of a large collection mirror with a hole in it achieves this criterion.

In one exemplary embodiment, diffuse reflectance apparatus 30 will be installed in a commercial Fourier Transform Near-Infrared (FT-NIR) spectrometer, such as the Nicolet iS5N FT-NIR Spectrometer ("iS5N") made by Thermo Fisher Scientific. The illumination beam in the iS5N has a numerical aperture of between approximately 0.7 and approximately 0.12 and a spot size of approximately 5 mm. This beam could be directed to sample 60 with minimal additional focusing, thus providing an illumination spot of approximately 5 mm.

In this embodiment, diffuse reflectance mirror 52 may have a numerical aperture of approximately 0.5 and an aperture 50 subtending a numerical aperture of 0.1, which would collect a substantial fraction of the scattered light. In such an embodiment, diffuse reflectance mirror 52 may have a primary focal length of approximately 25 mm, a secondary focal length of approximately 125 mm, and a numerical aperture of approximately 0.5, and an aperture 50 of approximately 12.5 mm diameter.

Figure 4:
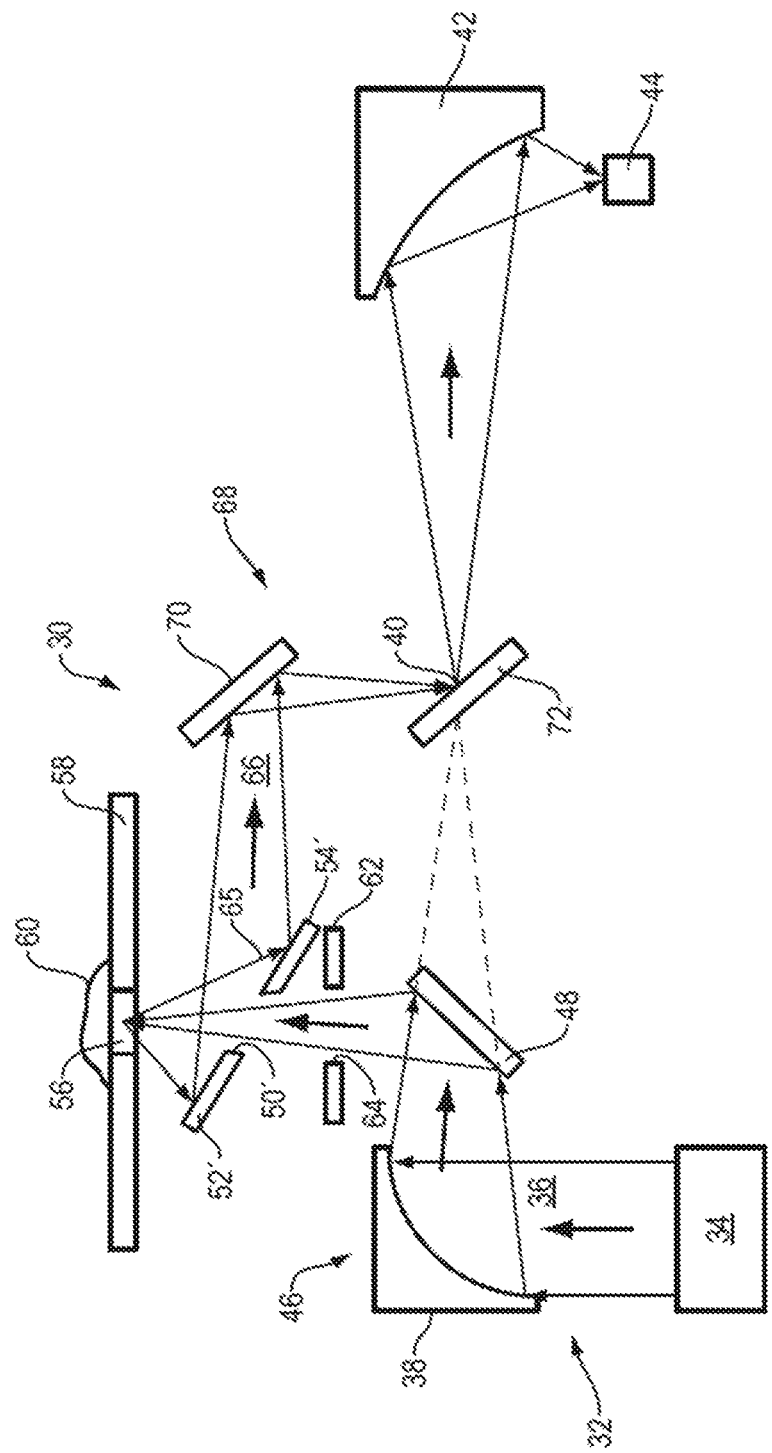
FIG. 4 is a schematic view of an alternative embodiment of a diffuse reflectance mirror in use with a spectrometer.

Another embodiment of diffuse reflectance apparatus 30 is illustrated in FIG. 4. This embodiment is similar to the embodiment discussed above, except that rather than being concave or concave ellipsoidal, a diffuse reflectance mirror 52' is a flat mirror. The reflective surface 54' about aperture 50' of diffuse reflectance mirror 52' may be diamond turned polished aluminum, or plastic as described above.

Figure 5:
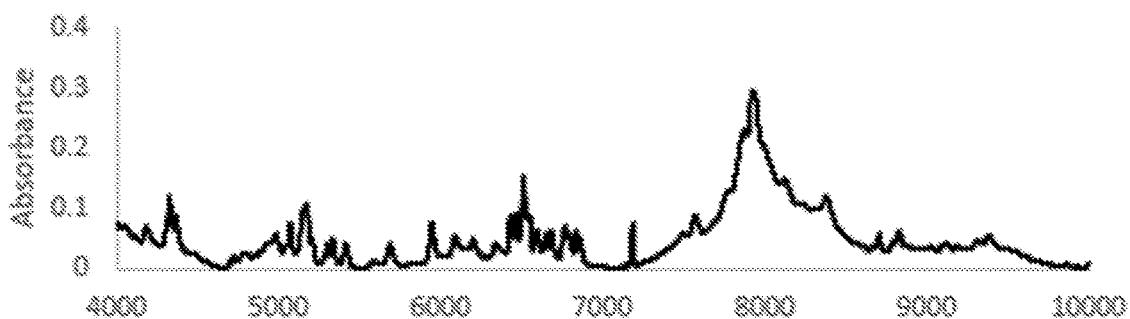
FIG. 5 is an illustrative view the absorbance at various wavelengths.
Figure 5:
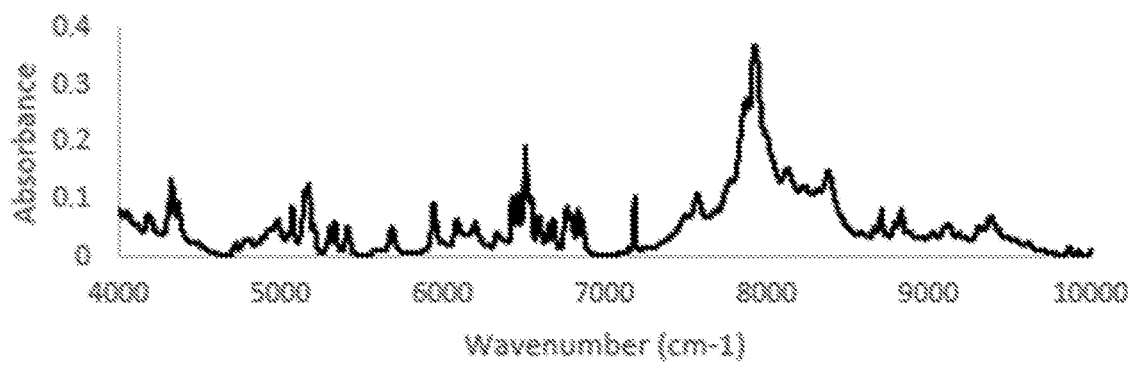

In a test, spectra of a Thermo Fisher Scientific KTA-1920X NIR standard were measured on a Thermo Fisher Scientific Antaris FT-IR spectrometer ("Prior Art") with integrating sphere, and a spectrometer of as described herein ("First Embodiment"). FIG. 5 provides graphs illustrating the absorbance at various wavelengths, and a tale showing the particular absorbance values at various wavelengths. It can be seen that the measured spectra are substantially similar, showing that the First Embodiment produces a result that is comparable to the Prior Art integrating sphere method. We have discovered that spectra measured with the First Embodiment are substantially similar to those collected with the Prior Art integrating sphere, and exhibit a good signal-to-noise ratio.

| Wavenumber | First Embodiment | Prior Art |
| --- | --- | --- |
| 3999.64 | 0.07522093 | 0.0811691 |
| 4003.497 | 0.0747218 | 0.0804613 |
| 4007.354 | 0.07354294 | 0.0792573 |
| 4011.211 | 0.07156228 | 0.0772835 |
| 4015.068 | 0.06967835 | 0.0750947 |
| 4018.925 | 0.06820525 | 0.0734294 |
| 4022.781 | 0.06735893 | 0.0724094 |
| 4026.638 | 0.06648885 | 0.0714274 |
| 4030.495 | 0.06554876 | 0.0702794 |
| 4034.352 | 0.06534301 | 0.0701422 |
| 4038.209 | 0.06612347 | 0.0709796 |
| 4042.066 | 0.06738488 | 0.0722909 |
| 4045.923 | 0.0690354 | 0.0742299 |
| 4049.78 | 0.07062586 | 0.0762432 |
| 4053.637 | 0.07084434 | 0.0765275 |
| 4057.494 | 0.06968994 | 0.075209 |
| 4061.351 | 0.06765486 | 0.0729899 |
| 4065.208 | 0.06480841 | 0.0697488 |
| 4069.065 | 0.06296568 | 0.0676268 |
| 4072.922 | 0.06163843 | 0.0661638 |
| 4076.779 | 0.05993293 | 0.0642568 |
| 4080.635 | 0.05848651 | 0.0626962 |
| 4084.492 | 0.05745418 | 0.0613841 |
| 4088.349 | 0.0560941 | 0.0597913 |
| 4092.206 | 0.05499692 | 0.0584986 |
| 4096.063 | 0.05482744 | 0.0582863 |
| 4099.92 | 0.0547644 | 0.0580231 |
| 4103.777 | 0.05458246 | 0.0577438 |
| 4107.634 | 0.053789 | 0.0568906 |
| 4111.491 | 0.05222712 | 0.0549198 |
| 4115.348 | 0.05237646 | 0.0548972 |
| 4119.205 | 0.05375122 | 0.0565498 |
| 4123.062 | 0.05303676 | 0.0557838 |
| 4126.919 | 0.05013759 | 0.0523268 |
| 4130.775 | 0.04771514 | 0.0494129 |
| 4134.633 | 0.04611208 | 0.0475323 |

-continued

| Wavenumber | First Embodiment | Prior Art |
| --- | --- | --- |
| 4138.489 | 0.04518221 | 0.0463586 |
| 4142.347 | 0.04464148 | 0.0457165 |
| 4146.203 | 0.04401834 | 0.0449601 |
| 4150.061 | 0.04368784 | 0.0444119 |
| 4153.917 | 0.04416461 | 0.0449427 |
| 4157.774 | 0.04550175 | 0.0466195 |
| 4161.631 | 0.0482731 | 0.0497262 |
| 4165.488 | 0.05320843 | 0.0552227 |
| 4169.345 | 0.05966736 | 0.0626618 |
| 4173.202 | 0.06420504 | 0.0678985 |
| 4177.059 | 0.06733353 | 0.0714285 |
| 4180.916 | 0.06959818 | 0.0742385 |
| 4184.772 | 0.06766714 | 0.0719682 |
| 4188.63 | 0.06512402 | 0.0690875 |
| 4192.486 | 0.06403227 | 0.0679418 |
| 4196.344 | 0.0625288 | 0.0662848 |
| 4200.2 | 0.06025313 | 0.0638052 |
| 4204.058 | 0.05771412 | 0.0610269 |
| 4207.914 | 0.05583061 | 0.0589417 |
| 4211.771 | 0.05341627 | 0.0561546 |
| 4215.628 | 0.04998122 | 0.0522043 |
| 4219.485 | 0.04697199 | 0.0488751 |
| 4223.342 | 0.04468022 | 0.0463137 |
| 4227.199 | 0.04284926 | 0.0442168 |
| 4231.056 | 0.0415674 | 0.0427814 |
| 4234.913 | 0.04107915 | 0.0422813 |
| 4238.77 | 0.0412849 | 0.0426221 |
| 4242.627 | 0.04151101 | 0.0429616 |
| 4246.483 | 0.04116301 | 0.0425492 |
| 4250.341 | 0.04016487 | 0.0414611 |
| 4254.197 | 0.03902622 | 0.0401872 |
| 4258.055 | 0.038045 | 0.0391148 |
| 4261.911 | 0.03733666 | 0.0383972 |
| 4265.769 | 0.03690787 | 0.0379865 |
| 4269.625 | 0.0368823 | 0.037958 |
| 4273.482 | 0.03729118 | 0.0384165 |
| 4277.339 | 0.03816809 | 0.0394521 |
| 4281.196 | 0.03947397 | 0.0410632 |
| 4285.053 | 0.04139747 | 0.0433281 |
| 4288.91 | 0.04437874 | 0.0467756 |
| 4292.767 | 0.04951771 | 0.0527344 |
| 4296.624 | 0.05708371 | 0.0616131 |
| 4300.48 | 0.06437166 | 0.0701584 |
| 4304.338 | 0.06850518 | 0.0749262 |
| 4308.194 | 0.07200862 | 0.0787322 |
| 4312.052 | 0.08033629 | 0.0879999 |
| 4315.908 | 0.09684806 | 0.1070514 |
| 4319.766 | 0.1138954 | 0.1274013 |
| 4323.622 | 0.1195431 | 0.1342199 |
| 4327.479 | 0.1142593 | 0.1281498 |
| 4331.336 | 0.1039579 | 0.1162878 |
| 4335.193 | 0.09239362 | 0.1029821 |
| 4339.05 | 0.08173122 | 0.0906123 |
| 4342.907 | 0.07299136 | 0.0804395 |
| 4346.764 | 0.06635304 | 0.0727531 |
| 4350.621 | 0.06231807 | 0.0679831 |
| 4354.478 | 0.06241055 | 0.0679021 |
| 4358.335 | 0.06910266 | 0.0755757 |
| 4362.191 | 0.07990779 | 0.088474 |
| 4366.049 | 0.0857677 | 0.0957198 |
| 4369.905 | 0.08111905 | 0.090498 |
| 4373.763 | 0.0708857 | 0.0785295 |
| 4377.619 | 0.06083523 | 0.0668012 |
| 4381.477 | 0.05353098 | 0.0583911 |
| 4385.333 | 0.04843341 | 0.0524756 |
| 4389.19 | 0.04458009 | 0.0479832 |
| 4393.047 | 0.0416203 | 0.0445865 |
| 4396.904 | 0.03913473 | 0.0417318 |
| 4400.761 | 0.03703849 | 0.0393662 |
| 4404.618 | 0.03530623 | 0.0373694 |
| 4408.475 | 0.03385137 | 0.035654 |
| 4412.332 | 0.03254296 | 0.0341049 |
| 4416.188 | 0.03139667 | 0.0327132 |
| 4420.046 | 0.03032504 | 0.0314903 |
| 4423.902 | 0.02935849 | 0.0304811 |
| 4427.76 | 0.02849679 | 0.0295493 |
| 4431.616 | 0.02768366 | 0.0286015 |
| 4435.474 | 0.02676851 | 0.0277021 |
| 4439.33 | 0.02593061 | 0.0268799 |
| 4443.188 | 0.02521609 | 0.02612 |
| 4447.044 | 0.0246584 | 0.0254926 |
| 4450.901 | 0.02414437 | 0.0249859 |
| 4454.758 | 0.02374722 | 0.0245248 |
| 4458.615 | 0.02345765 | 0.0242297 |
| 4462.472 | 0.02340578 | 0.0241585 |
| 4466.329 | 0.02352804 | 0.0243154 |
| 4470.186 | 0.02388881 | 0.024703 |
| 4474.043 | 0.02441095 | 0.0252752 |
| 4477.899 | 0.02485587 | 0.025742 |
| 4481.757 | 0.02470018 | 0.0256111 |
| 4485.613 | 0.02399892 | 0.0248387 |
| 4489.471 | 0.02295989 | 0.0236775 |
| 4493.327 | 0.02142371 | 0.021947 |
| 4497.185 | 0.01980244 | 0.0201809 |
| 4501.041 | 0.01861139 | 0.0189201 |
| 4504.898 | 0.01771809 | 0.018027 |
| 4508.755 | 0.01692916 | 0.0173269 |
| 4512.612 | 0.01615246 | 0.0167086 |
| 4516.469 | 0.0155524 | 0.0161762 |
| 4520.326 | 0.01500402 | 0.0156786 |
| 4524.183 | 0.01442344 | 0.0152197 |
| 4528.04 | 0.01381315 | 0.0146709 |
| 4531.896 | 0.01326117 | 0.0139989 |
| 4535.754 | 0.01273753 | 0.0133491 |
| 4539.61 | 0.01219606 | 0.0128175 |
| 4543.468 | 0.01163679 | 0.0122789 |
| 4547.324 | 0.01110888 | 0.011729 |
| 4551.182 | 0.01055066 | 0.0111917 |
| 4555.038 | 0.009974405 | 0.0106652 |
| 4558.896 | 0.009393349 | 0.010128 |
| 4562.752 | 0.008875728 | 0.009538 |
| 4566.609 | 0.008271292 | 0.0089146 |
| 4570.466 | 0.007694289 | 0.0083537 |
| 4574.323 | 0.007196546 | 0.0078792 |
| 4578.18 | 0.006820574 | 0.0075474 |
| 4582.037 | 0.006598309 | 0.0073791 |
| 4585.894 | 0.006376594 | 0.0072509 |
| 4589.751 | 0.006040961 | 0.0070181 |
| 4593.607 | 0.005705759 | 0.0066558 |
| 4597.465 | 0.005336642 | 0.0064009 |
| 4601.321 | 0.005025223 | 0.0062206 |
| 4605.179 | 0.004630432 | 0.0058716 |
| 4609.035 | 0.004176095 | 0.0053218 |
| 4612.893 | 0.003687203 | 0.0048243 |
| 4616.749 | 0.00327827 | 0.0044177 |
| 4620.606 | 0.002978712 | 0.0040744 |
| 4624.463 | 0.002704784 | 0.0037966 |
| 4628.32 | 0.002399459 | 0.0035369 |
| 4632.177 | 0.002235815 | 0.0033069 |
| 4636.034 | 0.002055138 | 0.0030586 |
| 4639.891 | 0.001752421 | 0.0027192 |
| 4643.748 | 0.001446545 | 0.0023879 |
| 4647.604 | 0.001319379 | 0.0022657 |
| 4651.462 | 0.001349911 | 0.0023449 |
| 4655.318 | 0.001461223 | 0.0024928 |
| 4659.176 | 0.001597866 | 0.0026197 |
| 4663.032 | 0.001749948 | 0.0027641 |
| 4666.89 | 0.001874074 | 0.0029893 |
| 4670.746 | 0.00207071 | 0.0032986 |
| 4674.604 | 0.002277493 | 0.0035074 |
| 4678.46 | 0.002468854 | 0.0036469 |
| 4682.317 | 0.002716511 | 0.0039819 |
| 4686.174 | 0.003364369 | 0.004764 |
| 4690.031 | 0.004724145 | 0.0063582 |
| 4693.888 | 0.007189497 | 0.0091784 |
| 4697.745 | 0.01017594 | 0.0126605 |
| 4701.602 | 0.0115077 | 0.014142 |
| 4705.459 | 0.01065472 | 0.0131098 |
| 4709.315 | 0.009808064 | 0.0121618 |
| 4713.173 | 0.01110832 | 0.01368 |
| 4717.029 | 0.01543786 | 0.0186868 |
| 4720.887 | 0.01954582 | 0.0234349 |
| 4724.743 | 0.01929666 | 0.0229453 |
| 4728.601 | 0.01602094 | 0.0190662 |

-continued

| Wavenumber | First Embodiment | Prior Art |
| --- | --- | --- |
| 4732.457 | 0.01287858 | 0.0154042 |
| 4736.314 | 0.01102881 | 0.0132699 |
| 4740.171 | 0.01098926 | 0.0132333 |
| 4744.028 | 0.01165427 | 0.0139399 |
| 4747.885 | 0.01255195 | 0.0148999 |
| 4751.742 | 0.0142104 | 0.0168973 |
| 4755.599 | 0.01588516 | 0.0188377 |
| 4759.456 | 0.01684502 | 0.0198888 |
| 4763.313 | 0.0180238 | 0.0213076 |
| 4767.17 | 0.01987039 | 0.0234526 |
| 4771.026 | 0.02162755 | 0.0254571 |
| 4774.884 | 0.02276947 | 0.026687 |
| 4778.74 | 0.0237651 | 0.0277767 |
| 4782.598 | 0.02497308 | 0.0291823 |
| 4786.454 | 0.02630796 | 0.0307878 |
| 4790.312 | 0.02721031 | 0.0318699 |
| 4794.168 | 0.0271617 | 0.0317708 |
| 4798.025 | 0.0261015 | 0.0305225 |
| 4801.882 | 0.02488555 | 0.0290771 |
| 4805.739 | 0.02423248 | 0.0283248 |
| 4809.596 | 0.02447997 | 0.0286217 |
| 4813.453 | 0.02482237 | 0.0290536 |
| 4817.31 | 0.02392964 | 0.0279548 |
| 4821.167 | 0.02150327 | 0.0250668 |
| 4825.023 | 0.01912318 | 0.0221855 |
| 4828.881 | 0.01794229 | 0.0208097 |
| 4832.737 | 0.01796903 | 0.0209513 |
| 4836.595 | 0.01831265 | 0.0214128 |
| 4840.451 | 0.01864445 | 0.0217408 |
| 4844.309 | 0.01965402 | 0.0229031 |
| 4848.165 | 0.02109317 | 0.0245514 |
| 4852.022 | 0.0221636 | 0.0257896 |
| 4855.879 | 0.02305622 | 0.0268812 |
| 4859.736 | 0.02340306 | 0.02726 |
| 4863.593 | 0.02274974 | 0.0264001 |
| 4867.45 | 0.02181689 | 0.0252121 |
| 4871.307 | 0.02168246 | 0.0250169 |
| 4875.164 | 0.02282645 | 0.0263916 |
| 4879.021 | 0.0248677 | 0.0287716 |
| 4882.878 | 0.02672444 | 0.0309101 |
| 4886.734 | 0.02816249 | 0.0326038 |
| 4890.592 | 0.02882324 | 0.0332943 |
| 4894.448 | 0.02858527 | 0.0328233 |
| 4898.306 | 0.0283602 | 0.0324382 |
| 4902.162 | 0.02890153 | 0.033025 |
| 4906.02 | 0.03042087 | 0.0347778 |
| 4909.876 | 0.0330068 | 0.0377668 |
| 4913.733 | 0.03561155 | 0.0407755 |
| 4917.59 | 0.03827472 | 0.0436977 |
| 4921.447 | 0.04032263 | 0.0459291 |
| 4925.304 | 0.0411263 | 0.0467735 |
| 4929.161 | 0.04124537 | 0.0467691 |
| 4933.018 | 0.04170616 | 0.0472223 |
| 4936.875 | 0.04275762 | 0.0483633 |
| 4940.731 | 0.04365017 | 0.0493047 |
| 4944.589 | 0.04342504 | 0.0488964 |
| 4948.445 | 0.04268609 | 0.0478919 |
| 4952.303 | 0.04257001 | 0.0476938 |
| 4956.159 | 0.04342487 | 0.048671 |
| 4960.017 | 0.04472643 | 0.0500462 |
| 4963.873 | 0.04647611 | 0.0518928 |
| 4967.73 | 0.04869457 | 0.0543355 |
| 4971.587 | 0.05102925 | 0.0569461 |
| 4975.444 | 0.05309708 | 0.0592603 |
| 4979.301 | 0.05516855 | 0.0615823 |
| 4983.158 | 0.05727781 | 0.0639852 |
| 4987.015 | 0.05780719 | 0.064635 |
| 4990.872 | 0.05434956 | 0.0605264 |
| 4994.729 | 0.04804794 | 0.05306 |
| 4998.586 | 0.04204988 | 0.0460805 |
| 5002.442 | 0.03808562 | 0.0415722 |
| 5006.3 | 0.03563093 | 0.0387358 |
| 5010.156 | 0.0337484 | 0.0365392 |
| 5014.014 | 0.03161331 | 0.0340809 |
| 5017.87 | 0.02940045 | 0.0315656 |
| 5021.728 | 0.02736816 | 0.0291945 |
| 5025.584 | 0.02662459 | 0.0283404 |

-continued

| Wavenumber | First Embodiment | Prior Art |
| --- | --- | --- |
| 5029.441 | 0.028245 | 0.0301283 |
| 5033.298 | 0.03311102 | 0.0359347 |
| 5037.155 | 0.03572476 | 0.0390773 |
| 5041.012 | 0.03607516 | 0.0395721 |
| 5044.869 | 0.03790118 | 0.0420835 |
| 5048.726 | 0.03847994 | 0.0429122 |
| 5052.583 | 0.03721055 | 0.0414816 |
| 5056.439 | 0.03658204 | 0.0405979 |
| 5060.297 | 0.03984828 | 0.0442621 |
| 5064.153 | 0.04986511 | 0.0559137 |
| 5068.011 | 0.06520735 | 0.0741483 |
| 5071.867 | 0.07593399 | 0.0871024 |
| 5075.725 | 0.07087268 | 0.0811282 |
| 5079.581 | 0.05452834 | 0.061764 |
| 5083.438 | 0.04063509 | 0.0457159 |
| 5087.295 | 0.03296544 | 0.0367658 |
| 5091.152 | 0.0288524 | 0.0320447 |
| 5095.009 | 0.02625762 | 0.0290756 |
| 5098.866 | 0.02453099 | 0.0270354 |
| 5102.723 | 0.02395223 | 0.0262423 |
| 5106.58 | 0.02461228 | 0.027035 |
| 5110.437 | 0.02627584 | 0.0289409 |
| 5114.294 | 0.02822988 | 0.0313179 |
| 5118.15 | 0.0304513 | 0.0340013 |
| 5122.008 | 0.03381012 | 0.0378417 |
| 5125.864 | 0.03896338 | 0.0437353 |
| 5129.722 | 0.04534417 | 0.0512528 |
| 5133.578 | 0.0529715 | 0.0602021 |
| 5137.436 | 0.06608745 | 0.0754487 |
| 5141.292 | 0.08728264 | 0.1012678 |
| 5145.149 | 0.09582858 | 0.111432 |
| 5149.006 | 0.09063601 | 0.1038784 |
| 5152.863 | 0.09416126 | 0.1090062 |
| 5156.72 | 0.09569409 | 0.110944 |
| 5160.577 | 0.09590521 | 0.1106322 |
| 5164.434 | 0.1028406 | 0.1194281 |
| 5168.291 | 0.1023387 | 0.1184468 |
| 5172.147 | 0.1015857 | 0.1169665 |
| 5176.005 | 0.1090895 | 0.1272976 |
| 5179.861 | 0.09653383 | 0.1120593 |
| 5183.719 | 0.0729412 | 0.0837424 |
| 5187.575 | 0.05636962 | 0.0651122 |
| 5191.433 | 0.04609534 | 0.0524317 |
| 5195.289 | 0.0420544 | 0.0475509 |
| 5199.146 | 0.04500873 | 0.0509478 |
| 5203.003 | 0.05151664 | 0.0583754 |
| 5206.86 | 0.04881592 | 0.0566846 |
| 5210.717 | 0.03986163 | 0.0462272 |
| 5214.574 | 0.03742194 | 0.0423888 |
| 5218.431 | 0.03373189 | 0.03826 |
| 5222.288 | 0.0246992 | 0.0269906 |
| 5226.145 | 0.01563974 | 0.0170009 |
| 5230.002 | 0.01126061 | 0.0119704 |
| 5233.858 | 0.0091362 | 0.009588 |
| 5237.716 | 0.008376852 | 0.0083441 |
| 5241.572 | 0.008584082 | 0.007701 |
| 5245.43 | 0.007916629 | 0.0073847 |
| 5249.286 | 0.007185698 | 0.0071779 |
| 5253.144 | 0.007450551 | 0.0072759 |
| 5257 | 0.007939905 | 0.0076553 |
| 5260.857 | 0.009281024 | 0.0086174 |
| 5264.714 | 0.009741187 | 0.0101818 |
| 5268.571 | 0.01119588 | 0.0121463 |
| 5272.428 | 0.0131771 | 0.0143458 |
| 5276.285 | 0.01516457 | 0.016402 |
| 5280.142 | 0.01694123 | 0.0185754 |
| 5283.999 | 0.01944828 | 0.0216372 |
| 5287.855 | 0.0236669 | 0.0266133 |
| 5291.713 | 0.0288323 | 0.033306 |
| 5295.569 | 0.03405027 | 0.039163 |
| 5299.427 | 0.03956904 | 0.045671 |
| 5303.283 | 0.04375117 | 0.0507716 |
| 5307.141 | 0.03818221 | 0.0449472 |
| 5310.997 | 0.02816714 | 0.0332151 |
| 5314.854 | 0.02260363 | 0.026249 |
| 5318.711 | 0.02225237 | 0.0259288 |
| 5322.568 | 0.02757357 | 0.0318413 |

| Wavenumber | First Embodiment | Prior Art |
| --- | --- | --- |
| 5326.425 | 0.03740211 | 0.0438747 |
| 5330.282 | 0.048204 | 0.0573218 |
| 5334.139 | 0.05195786 | 0.0612315 |
| 5337.996 | 0.04622017 | 0.0550912 |
| 5341.853 | 0.03973748 | 0.0475597 |
| 5345.71 | 0.03077094 | 0.0380515 |
| 5349.566 | 0.02202283 | 0.0264383 |
| 5353.424 | 0.01413748 | 0.0179771 |
| 5357.28 | 0.01018344 | 0.0137082 |
| 5361.138 | 0.009731635 | 0.0125366 |
| 5364.994 | 0.009386927 | 0.0128326 |
| 5368.852 | 0.01027669 | 0.0136058 |
| 5372.708 | 0.01144722 | 0.0146036 |
| 5376.565 | 0.01018511 | 0.0146008 |
| 5380.422 | 0.009238839 | 0.0131695 |
| 5384.279 | 0.008995101 | 0.0126024 |
| 5388.136 | 0.01015498 | 0.0143302 |
| 5391.993 | 0.0147029 | 0.0194566 |
| 5395.85 | 0.02033849 | 0.0273153 |
| 5399.707 | 0.02723448 | 0.0352059 |
| 5403.563 | 0.03301936 | 0.0418397 |
| 5407.421 | 0.03864336 | 0.0482968 |
| 5411.277 | 0.04038729 | 0.0520063 |
| 5415.135 | 0.03712663 | 0.0493571 |
| 5418.991 | 0.03447412 | 0.0446924 |
| 5422.849 | 0.03177048 | 0.0402735 |
| 5426.705 | 0.02526942 | 0.0323893 |
| 5430.563 | 0.01657917 | 0.0230593 |
| 5434.419 | 0.01111761 | 0.0163298 |
| 5438.276 | 0.008514062 | 0.0125918 |
| 5442.133 | 0.006955385 | 0.010621 |
| 5445.99 | 0.005285606 | 0.0093867 |
| 5449.847 | 0.004387811 | 0.0083933 |
| 5453.704 | 0.004417852 | 0.0076053 |
| 5457.561 | 0.004235432 | 0.0068726 |
| 5461.418 | 0.003210321 | 0.0060504 |
| 5465.274 | 0.002508357 | 0.0051275 |
| 5469.132 | 0.002269641 | 0.0043105 |
| 5472.988 | 0.002207369 | 0.0036766 |
| 5476.846 | 0.000866413 | 0.0031061 |
| 5480.702 | 0.000918046 | 0.0025239 |
| 5484.56 | 0.001214623 | 0.0021789 |
| 5488.416 | 0.001158506 | 0.0019021 |
| 5492.273 | 0.000337809 | 0.00166 |
| 5496.13 | 0 | 0.0013445 |
| 5499.987 | 0.000289425 | 0.0011324 |
| 5503.844 | 0.000523314 | 0.0009933 |
| 5507.701 | 0.000219271 | 0.0009256 |
| 5511.558 | 0.000241339 | 0.0008666 |
| 5515.415 | 0.000458464 | 0.0009134 |
| 5519.271 | 0.000430286 | 0.0009736 |
| 5523.129 | 0.000586078 | 0.0011072 |
| 5526.985 | 0.000894815 | 0.0012845 |
| 5530.843 | 0.001392052 | 0.0015643 |
| 5534.699 | 0.001644224 | 0.0019178 |
| 5538.557 | 0.001818582 | 0.0023536 |
| 5542.413 | 0.002278268 | 0.0027717 |
| 5546.271 | 0.002828822 | 0.0033345 |
| 5550.127 | 0.003322616 | 0.0039707 |
| 5553.984 | 0.003866315 | 0.0047531 |
| 5557.841 | 0.004601702 | 0.0056539 |
| 5561.698 | 0.00551495 | 0.0067477 |
| 5565.555 | 0.00642328 | 0.007953 |
| 5569.412 | 0.007456616 | 0.0092745 |
| 5573.269 | 0.008515999 | 0.0105771 |
| 5577.126 | 0.009550482 | 0.011861 |
| 5580.982 | 0.01036847 | 0.01299 |
| 5584.84 | 0.0109728 | 0.0138118 |
| 5588.696 | 0.01121427 | 0.0141498 |
| 5592.554 | 0.01110004 | 0.0140886 |
| 5596.41 | 0.01055309 | 0.0136136 |
| 5600.268 | 0.009894714 | 0.0129004 |
| 5604.124 | 0.00917165 | 0.0121402 |
| 5607.981 | 0.00849314 | 0.0114594 |
| 5611.838 | 0.007898107 | 0.0108957 |
| 5615.695 | 0.007398888 | 0.010514 |
| 5619.552 | 0.007119179 | 0.0102299 |

| Wavenumber | First Embodiment | Prior Art |
| --- | --- | --- |
| 5623.409 | 0.007026225 | 0.0101416 |
| 5627.266 | 0.006993607 | 0.0102085 |
| 5631.123 | 0.007102236 | 0.010445 |
| 5634.979 | 0.007302493 | 0.0107803 |
| 5638.837 | 0.007663637 | 0.011294 |
| 5642.693 | 0.008228362 | 0.0120039 |
| 5646.551 | 0.009023428 | 0.0130341 |
| 5650.407 | 0.01011048 | 0.0143568 |
| 5654.265 | 0.01158006 | 0.0161133 |
| 5658.121 | 0.01349361 | 0.0183871 |
| 5661.979 | 0.01600941 | 0.0213723 |
| 5665.835 | 0.01912849 | 0.0252456 |
| 5669.692 | 0.02311321 | 0.0301065 |
| 5673.549 | 0.02785955 | 0.0358845 |
| 5677.406 | 0.03306551 | 0.0422234 |
| 5681.263 | 0.03783377 | 0.0480405 |
| 5685.12 | 0.04089434 | 0.0518238 |
| 5688.977 | 0.04118888 | 0.0521694 |
| 5692.834 | 0.0387546 | 0.0490894 |
| 5696.69 | 0.03450482 | 0.0436678 |
| 5700.548 | 0.02958144 | 0.037566 |
| 5704.404 | 0.0249038 | 0.0318605 |
| 5708.262 | 0.02099136 | 0.0270149 |
| 5712.118 | 0.0177889 | 0.0230026 |
| 5715.976 | 0.0152857 | 0.0198605 |
| 5719.832 | 0.01333986 | 0.0173943 |
| 5723.689 | 0.01185097 | 0.0154707 |
| 5727.546 | 0.01067831 | 0.0138595 |
| 5731.403 | 0.009710342 | 0.0125113 |
| 5735.26 | 0.008825302 | 0.011346 |
| 5739.117 | 0.008132309 | 0.0103253 |
| 5742.974 | 0.007507086 | 0.0093767 |
| 5746.831 | 0.006996676 | 0.0085998 |
| 5750.688 | 0.006563306 | 0.007911 |
| 5754.545 | 0.006193653 | 0.0073851 |
| 5758.401 | 0.005891711 | 0.0069114 |
| 5762.259 | 0.00568518 | 0.0065227 |
| 5766.115 | 0.005584642 | 0.0062218 |
| 5769.973 | 0.00556159 | 0.0060801 |
| 5773.829 | 0.005489096 | 0.0059344 |
| 5777.687 | 0.005560607 | 0.0058664 |
| 5781.543 | 0.00566712 | 0.0058736 |
| 5785.4 | 0.005825177 | 0.0059472 |
| 5789.257 | 0.005980745 | 0.0060686 |
| 5793.114 | 0.006183192 | 0.0063368 |
| 5796.971 | 0.006432876 | 0.0066172 |
| 5800.828 | 0.006820098 | 0.0070206 |
| 5804.685 | 0.007304266 | 0.0075147 |
| 5808.542 | 0.007823065 | 0.0081231 |
| 5812.398 | 0.008322835 | 0.008751 |
| 5816.256 | 0.008764282 | 0.0093562 |
| 5820.112 | 0.009053901 | 0.0098138 |
| 5823.97 | 0.009190515 | 0.0100071 |
| 5827.826 | 0.009068385 | 0.0098457 |
| 5831.684 | 0.008716077 | 0.0094455 |
| 5835.54 | 0.008214459 | 0.008912 |
| 5839.397 | 0.007809579 | 0.0083974 |
| 5843.254 | 0.007381052 | 0.0078843 |
| 5847.111 | 0.007018238 | 0.0075442 |
| 5850.968 | 0.006806776 | 0.0073902 |
| 5854.825 | 0.006815895 | 0.0074204 |
| 5858.682 | 0.006986752 | 0.0076713 |
| 5862.539 | 0.007290334 | 0.00812 |
| 5866.396 | 0.007682949 | 0.0086226 |
| 5870.253 | 0.008267716 | 0.0092664 |
| 5874.109 | 0.008868292 | 0.0100039 |
| 5877.967 | 0.009326845 | 0.010625 |
| 5881.823 | 0.009530887 | 0.0108792 |
| 5885.681 | 0.009554565 | 0.0108793 |
| 5889.537 | 0.009440407 | 0.0107463 |
| 5893.395 | 0.009428933 | 0.010741 |
| 5897.251 | 0.009718254 | 0.0110844 |
| 5901.108 | 0.01050778 | 0.0119905 |
| 5904.965 | 0.01177093 | 0.0135018 |
| 5908.822 | 0.01365547 | 0.0157995 |
| 5912.679 | 0.01631558 | 0.0190197 |
| 5916.536 | 0.02005678 | 0.0235243 |

| Wavenumber | First Embodiment | Prior Art |
| --- | --- | --- |
| 5920.393 | 0.02512099 | 0.02965 |
| 5924.25 | 0.03210603 | 0.0380288 |
| 5928.106 | 0.04146211 | 0.0492995 |
| 5931.964 | 0.05313557 | 0.0636106 |
| 5935.82 | 0.06552957 | 0.0790441 |
| 5939.678 | 0.07483591 | 0.0908094 |
| 5943.534 | 0.07683502 | 0.0934395 |
| 5947.392 | 0.07152025 | 0.0868463 |
| 5951.248 | 0.06247336 | 0.0755841 |
| 5955.105 | 0.05330877 | 0.0641152 |
| 5958.962 | 0.04537396 | 0.0542438 |
| 5962.819 | 0.03897233 | 0.0462985 |
| 5966.676 | 0.03394537 | 0.0400591 |
| 5970.533 | 0.03012134 | 0.0353095 |
| 5974.39 | 0.0272273 | 0.0316928 |
| 5978.247 | 0.02504624 | 0.0290154 |
| 5982.104 | 0.02339889 | 0.0269833 |
| 5985.961 | 0.02234417 | 0.0255689 |
| 5989.817 | 0.02168308 | 0.0246358 |
| 5993.675 | 0.02150585 | 0.0242276 |
| 5997.531 | 0.02167599 | 0.0242876 |
| 6001.389 | 0.02213775 | 0.0247459 |
| 6005.245 | 0.0226233 | 0.0251646 |
| 6009.103 | 0.02278559 | 0.0251569 |
| 6012.959 | 0.02235912 | 0.0245329 |
| 6016.816 | 0.02165617 | 0.0236059 |
| 6020.673 | 0.02089053 | 0.0225381 |
| 6024.53 | 0.02019496 | 0.0215556 |
| 6028.387 | 0.0196214 | 0.0207485 |
| 6032.244 | 0.01932488 | 0.0202683 |
| 6036.101 | 0.01924866 | 0.0200175 |
| 6039.958 | 0.01942834 | 0.0200489 |
| 6043.814 | 0.0197127 | 0.0203347 |
| 6047.672 | 0.02036682 | 0.0210979 |
| 6051.528 | 0.02164292 | 0.0225471 |
| 6055.386 | 0.02376488 | 0.0250442 |
| 6059.242 | 0.02678575 | 0.0286463 |
| 6063.1 | 0.03083427 | 0.0334457 |
| 6066.956 | 0.0357814 | 0.0394286 |
| 6070.813 | 0.04150142 | 0.046441 |
| 6074.67 | 0.04736315 | 0.0536443 |
| 6078.527 | 0.0522366 | 0.0598499 |
| 6082.384 | 0.05500662 | 0.0634328 |
| 6086.241 | 0.05530518 | 0.0639044 |
| 6090.098 | 0.05355616 | 0.0617465 |
| 6093.955 | 0.05073683 | 0.0582513 |
| 6097.812 | 0.04750831 | 0.0543998 |
| 6101.669 | 0.0445473 | 0.0508471 |
| 6105.525 | 0.04189344 | 0.0477118 |
| 6109.383 | 0.03968002 | 0.0451725 |
| 6113.239 | 0.03787048 | 0.0430636 |
| 6117.097 | 0.03652076 | 0.0414429 |
| 6120.953 | 0.03553171 | 0.040307 |
| 6124.811 | 0.03498703 | 0.0397921 |
| 6128.667 | 0.03480515 | 0.0398031 |
| 6132.524 | 0.03495108 | 0.0402733 |
| 6136.381 | 0.0351864 | 0.0406907 |
| 6140.238 | 0.03513442 | 0.0407658 |
| 6144.095 | 0.03460832 | 0.0402844 |
| 6147.952 | 0.03393874 | 0.0395706 |
| 6151.809 | 0.03332697 | 0.0389937 |
| 6155.666 | 0.03308621 | 0.0389041 |
| 6159.522 | 0.0331205 | 0.0391716 |
| 6163.38 | 0.03343429 | 0.03974 |
| 6167.236 | 0.03389014 | 0.0403373 |
| 6171.094 | 0.03438704 | 0.0410664 |
| 6174.95 | 0.03484523 | 0.0418159 |
| 6178.808 | 0.03559038 | 0.0427568 |
| 6182.664 | 0.03669046 | 0.0441525 |
| 6186.521 | 0.03865413 | 0.0466197 |
| 6190.378 | 0.04154555 | 0.0502551 |
| 6194.235 | 0.04497041 | 0.0546904 |
| 6198.092 | 0.04766037 | 0.0582318 |
| 6201.949 | 0.04839657 | 0.0591852 |
| 6205.806 | 0.04646544 | 0.0569088 |
| 6209.663 | 0.04301678 | 0.0526051 |
| 6213.52 | 0.03918798 | 0.0477102 |

| Wavenumber | First Embodiment | Prior Art |
| --- | --- | --- |
| 6217.377 | 0.0356738 | 0.0433141 |
| 6221.233 | 0.03260735 | 0.0394465 |
| 6225.091 | 0.03004958 | 0.0360898 |
| 6228.947 | 0.02786003 | 0.0331818 |
| 6232.805 | 0.02623077 | 0.0310475 |
| 6236.661 | 0.02529024 | 0.0297091 |
| 6240.519 | 0.02528712 | 0.0293962 |
| 6244.375 | 0.02545556 | 0.0293284 |
| 6248.232 | 0.02480099 | 0.0282854 |
| 6252.089 | 0.02287732 | 0.0256879 |
| 6255.946 | 0.0208029 | 0.0229298 |
| 6259.803 | 0.01931372 | 0.0208683 |
| 6263.66 | 0.01871535 | 0.0198913 |
| 6267.517 | 0.01893094 | 0.0197834 |
| 6271.374 | 0.01994096 | 0.0207721 |
| 6275.23 | 0.02133243 | 0.022193 |
| 6279.088 | 0.02199832 | 0.0226476 |
| 6282.944 | 0.02115956 | 0.0213361 |
| 6286.802 | 0.01991907 | 0.0196397 |
| 6290.658 | 0.01904051 | 0.0184297 |
| 6294.516 | 0.01881282 | 0.0179563 |
| 6298.372 | 0.01895295 | 0.0178589 |
| 6302.229 | 0.01952626 | 0.0183081 |
| 6306.086 | 0.02025732 | 0.0189569 |
| 6309.943 | 0.02132659 | 0.0200679 |
| 6313.8 | 0.02313003 | 0.0219819 |
| 6317.657 | 0.02639666 | 0.0256383 |
| 6321.514 | 0.03096215 | 0.0308222 |
| 6325.371 | 0.03587957 | 0.0365703 |
| 6329.228 | 0.03955846 | 0.0407692 |
| 6333.085 | 0.04113506 | 0.0425415 |
| 6336.941 | 0.04091434 | 0.0421432 |
| 6340.799 | 0.04003589 | 0.0410551 |
| 6344.655 | 0.03899582 | 0.0397537 |
| 6348.513 | 0.03794487 | 0.038495 |
| 6352.369 | 0.03655069 | 0.0368211 |
| 6356.227 | 0.03496905 | 0.035031 |
| 6360.083 | 0.03297435 | 0.0327398 |
| 6363.94 | 0.03113942 | 0.0306492 |
| 6367.797 | 0.02987541 | 0.0291902 |
| 6371.654 | 0.02974799 | 0.0292236 |
| 6375.511 | 0.03040691 | 0.0302754 |
| 6379.368 | 0.03119986 | 0.0314812 |
| 6383.225 | 0.03085618 | 0.0313198 |
| 6387.082 | 0.02964149 | 0.0300488 |
| 6390.938 | 0.0277897 | 0.0280659 |
| 6394.796 | 0.02569681 | 0.0257874 |
| 6398.652 | 0.02397731 | 0.0239517 |
| 6402.51 | 0.02408899 | 0.0244328 |
| 6406.366 | 0.02588376 | 0.0268164 |
| 6410.224 | 0.03008707 | 0.0321214 |
| 6414.08 | 0.03792442 | 0.0416455 |
| 6417.938 | 0.0527904 | 0.0598583 |
| 6421.794 | 0.07388282 | 0.0859674 |
| 6425.651 | 0.08803315 | 0.1041 |
| 6429.508 | 0.08441912 | 0.0995451 |
| 6433.365 | 0.07482536 | 0.0882143 |
| 6437.222 | 0.06536588 | 0.0768968 |
| 6441.079 | 0.05578931 | 0.065241 |
| 6444.936 | 0.05029458 | 0.0584822 |
| 6448.793 | 0.05399743 | 0.0632674 |
| 6452.649 | 0.0695651 | 0.0822166 |
| 6456.507 | 0.09023906 | 0.1092552 |
| 6460.363 | 0.08004436 | 0.0950526 |
| 6464.221 | 0.06542735 | 0.0770519 |
| 6468.077 | 0.0733142 | 0.0882785 |
| 6471.935 | 0.07736321 | 0.0937773 |
| 6475.791 | 0.06485187 | 0.0778088 |
| 6479.648 | 0.05040647 | 0.0597664 |
| 6483.505 | 0.0472102 | 0.0561393 |
| 6487.362 | 0.05322878 | 0.0637784 |
| 6491.219 | 0.06195839 | 0.074437 |
| 6495.076 | 0.07396664 | 0.088946 |
| 6498.933 | 0.09486403 | 0.1150586 |
| 6502.79 | 0.120936 | 0.1479713 |
| 6506.646 | 0.1452657 | 0.1792302 |
| 6510.504 | 0.154715 | 0.1919948 |

-continued

| Wavenumber | First Embodiment | Prior Art |
|---|---|---|
| 6514.36 | 0.135283 | 0.166126 |
| 6518.218 | 0.1073956 | 0.1299629 |
| 6522.074 | 0.09001584 | 0.1082086 |
| 6525.932 | 0.08238681 | 0.098278 |
| 6529.788 | 0.08385719 | 0.1004184 |
| 6533.646 | 0.08276998 | 0.0987092 |
| 6537.502 | 0.07906327 | 0.0931245 |
| 6541.359 | 0.08284016 | 0.0978311 |
| 6545.216 | 0.08711143 | 0.1027283 |
| 6549.073 | 0.08297156 | 0.0975024 |
| 6552.93 | 0.06534784 | 0.0749683 |
| 6556.787 | 0.04597588 | 0.0506768 |
| 6560.644 | 0.03506534 | 0.0371136 |
| 6564.501 | 0.03060566 | 0.0313862 |
| 6568.357 | 0.02941364 | 0.0296778 |
| 6572.215 | 0.02990265 | 0.0297995 |
| 6576.071 | 0.03309315 | 0.0331617 |
| 6579.929 | 0.03990455 | 0.0409384 |
| 6583.785 | 0.05008426 | 0.0531077 |
| 6587.643 | 0.05863218 | 0.063087 |
| 6591.499 | 0.06289689 | 0.0678622 |
| 6595.356 | 0.06306234 | 0.0676555 |
| 6599.213 | 0.05847134 | 0.0614759 |
| 6603.07 | 0.05130567 | 0.0522583 |
| 6606.927 | 0.04551117 | 0.0449179 |
| 6610.784 | 0.0417147 | 0.0399953 |
| 6614.641 | 0.03829224 | 0.0355174 |
| 6618.498 | 0.03444757 | 0.03055 |
| 6622.354 | 0.03136577 | 0.0265991 |
| 6626.212 | 0.02989158 | 0.0245387 |
| 6630.068 | 0.03047769 | 0.0250115 |
| 6633.926 | 0.03337838 | 0.0281633 |
| 6637.782 | 0.03927256 | 0.0349438 |
| 6641.64 | 0.04827775 | 0.0456318 |
| 6645.496 | 0.05706173 | 0.0563575 |
| 6649.354 | 0.05834356 | 0.0580361 |
| 6653.21 | 0.05119677 | 0.0493498 |
| 6657.067 | 0.04222555 | 0.0385786 |
| 6660.924 | 0.03618307 | 0.0314601 |
| 6664.781 | 0.03348435 | 0.0284203 |
| 6668.638 | 0.03387447 | 0.0290984 |
| 6672.495 | 0.03728025 | 0.0333314 |
| 6676.352 | 0.04406153 | 0.0417415 |
| 6680.209 | 0.05358179 | 0.0534997 |
| 6684.065 | 0.06111665 | 0.0633233 |
| 6687.923 | 0.06017619 | 0.062729 |
| 6691.779 | 0.05151737 | 0.0526355 |
| 6695.637 | 0.0418994 | 0.0413091 |
| 6699.493 | 0.03484879 | 0.0331719 |
| 6703.351 | 0.02992468 | 0.0276916 |
| 6707.207 | 0.02624121 | 0.0237686 |
| 6711.064 | 0.02328157 | 0.0207278 |
| 6714.921 | 0.02105609 | 0.0185586 |
| 6718.778 | 0.01943663 | 0.0170683 |
| 6722.635 | 0.01831309 | 0.016295 |
| 6726.492 | 0.01768349 | 0.0160938 |
| 6730.349 | 0.01780818 | 0.0168029 |
| 6734.206 | 0.01890685 | 0.0186823 |
| 6738.063 | 0.02146523 | 0.0223167 |
| 6741.92 | 0.02643266 | 0.0289227 |
| 6745.776 | 0.03544207 | 0.0405229 |
| 6749.634 | 0.04685922 | 0.0554085 |
| 6753.49 | 0.05416198 | 0.0650761 |
| 6757.348 | 0.05762361 | 0.0697019 |
| 6761.204 | 0.06450285 | 0.0791442 |
| 6765.062 | 0.06955253 | 0.0864921 |
| 6768.918 | 0.06380819 | 0.0796915 |
| 6772.775 | 0.05529447 | 0.0691846 |
| 6776.632 | 0.05134706 | 0.0647452 |
| 6780.489 | 0.04979622 | 0.0630202 |
| 6784.346 | 0.05135193 | 0.0652917 |
| 6788.203 | 0.05550347 | 0.0711452 |
| 6792.06 | 0.0566002 | 0.0729194 |
| 6795.917 | 0.05522729 | 0.0711124 |
| 6799.773 | 0.05413555 | 0.0704507 |
| 6803.631 | 0.04683419 | 0.061548 |
| 6807.487 | 0.03537484 | 0.0467801 |
| 6811.345 | 0.02809359 | 0.0376578 |
| 6815.201 | 0.02688579 | 0.0363094 |
| 6819.059 | 0.03109647 | 0.0416591 |
| 6822.915 | 0.03870077 | 0.0515046 |
| 6826.772 | 0.04335727 | 0.057583 |
| 6830.629 | 0.04554558 | 0.0597755 |
| 6834.486 | 0.05377229 | 0.0701901 |
| 6838.343 | 0.06158446 | 0.0808478 |
| 6842.2 | 0.05394141 | 0.0710167 |
| 6846.057 | 0.03880547 | 0.0515982 |
| 6849.914 | 0.03012176 | 0.0404521 |
| 6853.771 | 0.0301356 | 0.0400242 |
| 6857.628 | 0.03799681 | 0.0495906 |
| 6861.484 | 0.04821037 | 0.063033 |
| 6865.342 | 0.04901563 | 0.0644359 |
| 6869.198 | 0.03849603 | 0.0507375 |
| 6873.056 | 0.02699523 | 0.035818 |
| 6876.912 | 0.01963843 | 0.026261 |
| 6880.77 | 0.01533857 | 0.0206025 |
| 6884.626 | 0.01259238 | 0.0169911 |
| 6888.483 | 0.01084037 | 0.0145809 |
| 6892.34 | 0.009469554 | 0.0127882 |
| 6896.197 | 0.008462042 | 0.011453 |
| 6900.054 | 0.007917508 | 0.0104567 |
| 6903.911 | 0.007505044 | 0.009719 |
| 6907.768 | 0.007142991 | 0.0090979 |
| 6911.625 | 0.007022947 | 0.0085103 |
| 6915.481 | 0.006793573 | 0.0079538 |
| 6919.339 | 0.006349832 | 0.0074159 |
| 6923.195 | 0.006043449 | 0.0068142 |
| 6927.053 | 0.005740657 | 0.0061399 |
| 6930.909 | 0.005460858 | 0.0055631 |
| 6934.767 | 0.005281836 | 0.0051417 |
| 6938.623 | 0.005102396 | 0.0047751 |
| 6942.48 | 0.005153582 | 0.0045964 |
| 6946.337 | 0.005123362 | 0.0044345 |
| 6950.194 | 0.005124256 | 0.0042243 |
| 6954.051 | 0.005037263 | 0.0039901 |
| 6957.908 | 0.004822299 | 0.0037266 |
| 6961.765 | 0.004813448 | 0.0034963 |
| 6965.622 | 0.004866794 | 0.0032976 |
| 6969.479 | 0.004790068 | 0.0031246 |
| 6973.336 | 0.004581884 | 0.0029823 |
| 6977.192 | 0.004619896 | 0.0029281 |
| 6981.05 | 0.004577905 | 0.0030116 |
| 6984.906 | 0.004429951 | 0.0030553 |
| 6988.764 | 0.004368648 | 0.0030539 |
| 6992.62 | 0.004367501 | 0.0029749 |
| 6996.478 | 0.004235029 | 0.0028969 |
| 7000.334 | 0.003913879 | 0.0027786 |
| 7004.191 | 0.003509581 | 0.0026047 |
| 7008.048 | 0.003241748 | 0.0024497 |
| 7011.905 | 0.003033727 | 0.0023504 |
| 7015.762 | 0.0026609 | 0.0022222 |
| 7019.619 | 0.002449915 | 0.0021528 |
| 7023.476 | 0.00202848 | 0.0020942 |
| 7027.333 | 0.001697913 | 0.0020546 |
| 7031.189 | 0.001576409 | 0.0019604 |
| 7035.047 | 0.00139077 | 0.0019311 |
| 7038.903 | 0.001241684 | 0.0019655 |
| 7042.761 | 0.00114511 | 0.002066 |
| 7046.617 | 0.000712439 | 0.0022037 |
| 7050.475 | 0.000590533 | 0.0024947 |
| 7054.331 | 0.000570044 | 0.0028764 |
| 7058.188 | 0.000577867 | 0.0032969 |
| 7062.045 | 0.000793234 | 0.0037519 |
| 7065.902 | 0.001073301 | 0.0042568 |
| 7069.759 | 0.000763536 | 0.0046895 |
| 7073.616 | 0.000597194 | 0.0051191 |
| 7077.473 | 0.001030624 | 0.0055434 |
| 7081.33 | 0.001116991 | 0.0059915 |
| 7085.187 | 0.001318827 | 0.0063821 |
| 7089.044 | 0.001831949 | 0.0068589 |
| 7092.9 | 0.001837879 | 0.0073302 |
| 7096.758 | 0.001322284 | 0.0077797 |
| 7100.614 | 0.001977056 | 0.00803 |
| 7104.472 | 0.002032116 | 0.0083698 |

| Wavenumber | First Embodiment | Prior Art | | Wavenumber | First Embodiment | Prior Art |
| --- | --- | --- | --- | --- | --- | --- |
| 7108.328 | 0.00160265 | 0.0086436 | | 7405.313 | 0.03400032 | 0.036283 |
| 7112.186 | 0.002447382 | 0.0089723 | | 7409.169 | 0.034364 | 0.0369366 |
| 7116.042 | 0.0021258 | 0.0091999 | | 7413.026 | 0.03486042 | 0.0374442 |
| 7119.899 | 0.001080632 | 0.0091737 | | 7416.883 | 0.03514902 | 0.0379363 |
| 7123.756 | 0.001503855 | 0.0090991 | | 7420.74 | 0.03536677 | 0.0385285 |
| 7127.613 | 0.001712084 | 0.009213 | | 7424.597 | 0.03589371 | 0.0393506 |
| 7131.47 | 0.002103359 | 0.0092631 | | 7428.454 | 0.03655189 | 0.0402792 |
| 7135.327 | 0.002223209 | 0.0096226 | | 7432.311 | 0.03744651 | 0.0414579 |
| 7139.184 | 0.001747996 | 0.0098558 | | 7436.168 | 0.03834341 | 0.042728 |
| 7143.041 | 0.001950741 | 0.0105711 | | 7440.024 | 0.03934322 | 0.0442569 |
| 7146.897 | 0.003993943 | 0.012703 | | 7443.882 | 0.04043506 | 0.0459496 |
| 7150.755 | 0.008028716 | 0.017766 | | 7447.738 | 0.0416321 | 0.047712 |
| 7154.611 | 0.009022459 | 0.0185465 | | 7451.596 | 0.04286726 | 0.0494443 |
| 7158.469 | 0.005954906 | 0.0145239 | | 7455.452 | 0.04415111 | 0.0513804 |
| 7162.325 | 0.004411161 | 0.0134973 | | 7459.31 | 0.04551598 | 0.0533213 |
| 7166.183 | 0.004988357 | 0.0144578 | | 7463.166 | 0.04707371 | 0.0553418 |
| 7170.039 | 0.006711572 | 0.016811 | | 7467.023 | 0.04858804 | 0.0574331 |
| 7173.896 | 0.01223341 | 0.0225623 | | 7470.88 | 0.05001049 | 0.0596485 |
| 7177.753 | 0.0260127 | 0.0396421 | | 7474.737 | 0.05160679 | 0.061854 |
| 7181.61 | 0.05682229 | 0.0814824 | | 7478.594 | 0.05332102 | 0.0641896 |
| 7185.467 | 0.07372798 | 0.1063542 | | 7482.451 | 0.05494525 | 0.0664273 |
| 7189.324 | 0.04437791 | 0.0638662 | | 7486.308 | 0.056371 | 0.0686059 |
| 7193.181 | 0.01781602 | 0.0292448 | | 7490.165 | 0.05760744 | 0.070458 |
| 7197.038 | 0.01054071 | 0.0197313 | | 7494.021 | 0.058549 | 0.0718525 |
| 7200.895 | 0.008567154 | 0.016976 | | 7497.879 | 0.05891301 | 0.0725139 |
| 7204.752 | 0.006428704 | 0.0153133 | | 7501.735 | 0.0586061 | 0.0722224 |
| 7208.608 | 0.006156579 | 0.0143397 | | 7505.593 | 0.05762748 | 0.07108 |
| 7212.466 | 0.006432235 | 0.0136159 | | 7509.449 | 0.05641374 | 0.0695992 |
| 7216.322 | 0.006261885 | 0.0133705 | | 7513.307 | 0.0553983 | 0.0682441 |
| 7220.18 | 0.005857572 | 0.0132107 | | 7517.163 | 0.05475041 | 0.0674501 |
| 7224.036 | 0.006560966 | 0.0133981 | | 7521.021 | 0.05452125 | 0.0673941 |
| 7227.894 | 0.007834554 | 0.0137366 | | 7524.877 | 0.05501766 | 0.068156 |
| 7231.75 | 0.006983101 | 0.0143773 | | 7528.734 | 0.05610628 | 0.0695898 |
| 7235.607 | 0.007682711 | 0.0148115 | | 7532.591 | 0.0576788 | 0.0717135 |
| 7239.464 | 0.009675801 | 0.0155962 | | 7536.448 | 0.059751 | 0.0744991 |
| 7243.321 | 0.008656263 | 0.0162879 | | 7540.305 | 0.06235699 | 0.0779892 |
| 7247.178 | 0.009991929 | 0.016854 | | 7544.162 | 0.06552453 | 0.0821877 |
| 7251.035 | 0.01108041 | 0.0173592 | | 7548.019 | 0.06931071 | 0.0871527 |
| 7254.892 | 0.01129761 | 0.0177871 | | 7551.876 | 0.07349868 | 0.0928234 |
| 7258.749 | 0.01215607 | 0.018015 | | 7555.732 | 0.07800265 | 0.0989595 |
| 7262.605 | 0.01212582 | 0.0181412 | | 7559.59 | 0.0823213 | 0.1047231 |
| 7266.463 | 0.0121904 | 0.0178739 | | 7563.446 | 0.08556984 | 0.1090244 |
| 7270.319 | 0.01233342 | 0.0175135 | | 7567.304 | 0.08686088 | 0.1106733 |
| 7274.177 | 0.01209238 | 0.0170645 | | 7571.16 | 0.08610062 | 0.1093758 |
| 7278.033 | 0.01214616 | 0.0167532 | | 7575.018 | 0.08367153 | 0.1058597 |
| 7281.891 | 0.01234762 | 0.0164656 | | 7578.874 | 0.08040877 | 0.1011202 |
| 7285.747 | 0.01267397 | 0.0163422 | | 7582.731 | 0.07684565 | 0.0960151 |
| 7289.604 | 0.01314561 | 0.016261 | | 7586.588 | 0.07345368 | 0.0911268 |
| 7293.461 | 0.01326393 | 0.0163676 | | 7590.445 | 0.07024704 | 0.0866043 |
| 7297.318 | 0.01322083 | 0.0164784 | | 7594.302 | 0.06744085 | 0.0825744 |
| 7301.175 | 0.01408139 | 0.0167435 | | 7598.159 | 0.06507458 | 0.0790559 |
| 7305.032 | 0.01502831 | 0.0170246 | | 7602.016 | 0.06315713 | 0.0762213 |
| 7308.889 | 0.01508552 | 0.0174516 | | 7605.873 | 0.06181006 | 0.0740413 |
| 7312.746 | 0.01524985 | 0.0178104 | | 7609.729 | 0.0610107 | 0.0724658 |
| 7316.603 | 0.01616988 | 0.0182609 | | 7613.587 | 0.06054907 | 0.0712906 |
| 7320.46 | 0.01783499 | 0.0188536 | | 7617.443 | 0.06040974 | 0.0706009 |
| 7324.316 | 0.01900758 | 0.0196858 | | 7621.301 | 0.06061576 | 0.0702541 |
| 7328.174 | 0.01865759 | 0.0205159 | | 7625.157 | 0.06096981 | 0.070169 |
| 7332.03 | 0.01965071 | 0.0214469 | | 7629.015 | 0.06137703 | 0.0701503 |
| 7335.888 | 0.02226484 | 0.0224939 | | 7632.871 | 0.06182331 | 0.0702174 |
| 7339.744 | 0.02304788 | 0.0236364 | | 7636.729 | 0.06237434 | 0.0703768 |
| 7343.602 | 0.02303685 | 0.0244762 | | 7640.585 | 0.06296475 | 0.0705624 |
| 7347.458 | 0.0237259 | 0.025218 | | 7644.442 | 0.06355874 | 0.0707056 |
| 7351.315 | 0.02475399 | 0.0257768 | | 7648.299 | 0.06434618 | 0.0709628 |
| 7355.172 | 0.02519126 | 0.0261821 | | 7652.156 | 0.06517692 | 0.0712762 |
| 7359.029 | 0.025318 | 0.0264156 | | 7656.013 | 0.06601976 | 0.0717183 |
| 7362.886 | 0.02616595 | 0.0267762 | | 7659.87 | 0.06696017 | 0.0722147 |
| 7366.743 | 0.02650042 | 0.0272753 | | 7663.727 | 0.06816795 | 0.0729532 |
| 7370.6 | 0.02726115 | 0.0279063 | | 7667.584 | 0.0695339 | 0.0738949 |
| 7374.457 | 0.02815217 | 0.0286904 | | 7671.44 | 0.07087669 | 0.0750406 |
| 7378.313 | 0.02875951 | 0.0296071 | | 7675.298 | 0.07239473 | 0.0763286 |
| 7382.171 | 0.02926457 | 0.0305507 | | 7679.154 | 0.07419209 | 0.0778302 |
| 7386.027 | 0.03022273 | 0.0316489 | | 7683.012 | 0.07598965 | 0.079209 |
| 7389.885 | 0.03123073 | 0.0327794 | | 7686.868 | 0.07752202 | 0.0801846 |
| 7393.741 | 0.03204742 | 0.0338171 | | 7690.726 | 0.07868795 | 0.0806705 |
| 7397.599 | 0.03282279 | 0.034692 | | 7694.582 | 0.07932657 | 0.0806401 |
| 7401.455 | 0.03358418 | 0.0355757 | | 7698.439 | 0.07953973 | 0.0801297 |

| Wavenumber | First Embodiment | Prior Art |
| --- | --- | --- |
| 7702.296 | 0.07977322 | 0.0796316 |
| 7706.153 | 0.08042417 | 0.0796723 |
| 7710.01 | 0.081808 | 0.0806583 |
| 7713.867 | 0.08399327 | 0.0824827 |
| 7717.724 | 0.0866278 | 0.0849978 |
| 7721.581 | 0.08962683 | 0.0880788 |
| 7725.438 | 0.0930513 | 0.0918296 |
| 7729.295 | 0.09682225 | 0.0960078 |
| 7733.151 | 0.1008562 | 0.1005218 |
| 7737.009 | 0.1048191 | 0.1050165 |
| 7740.865 | 0.1087329 | 0.1095211 |
| 7744.723 | 0.1124724 | 0.1137265 |
| 7748.579 | 0.1157785 | 0.1175558 |
| 7752.437 | 0.1187918 | 0.1209929 |
| 7756.293 | 0.1213319 | 0.1239507 |
| 7760.15 | 0.123276 | 0.1262261 |
| 7764.007 | 0.1249777 | 0.1282586 |
| 7767.864 | 0.1268317 | 0.1302047 |
| 7771.721 | 0.1285818 | 0.1322224 |
| 7775.578 | 0.1298757 | 0.1337897 |
| 7779.435 | 0.1301078 | 0.1341947 |
| 7783.292 | 0.12941 | 0.1332093 |
| 7787.148 | 0.1284602 | 0.1316464 |
| 7791.006 | 0.1278389 | 0.1305356 |
| 7794.862 | 0.127907 | 0.1307821 |
| 7798.72 | 0.1290786 | 0.1325727 |
| 7802.576 | 0.1316536 | 0.1360694 |
| 7806.434 | 0.1354728 | 0.1410634 |
| 7810.29 | 0.1403659 | 0.1476063 |
| 7814.147 | 0.1462381 | 0.1553691 |
| 7818.004 | 0.1524579 | 0.1639349 |
| 7821.861 | 0.1588249 | 0.172632 |
| 7825.718 | 0.165131 | 0.1813232 |
| 7829.575 | 0.1714785 | 0.1901588 |
| 7833.432 | 0.1782293 | 0.1996005 |
| 7837.289 | 0.1854718 | 0.2096324 |
| 7841.146 | 0.1926902 | 0.2199396 |
| 7845.003 | 0.1997502 | 0.2301371 |
| 7848.859 | 0.2064581 | 0.2400449 |
| 7852.717 | 0.2128636 | 0.2490967 |
| 7856.573 | 0.2183071 | 0.2569377 |
| 7860.431 | 0.2225684 | 0.2633238 |
| 7864.287 | 0.2265041 | 0.2688043 |
| 7868.145 | 0.2300245 | 0.2738183 |
| 7872.001 | 0.2325264 | 0.2776571 |
| 7875.858 | 0.2331776 | 0.2786062 |
| 7879.715 | 0.2313906 | 0.2758053 |
| 7883.572 | 0.2273052 | 0.2695797 |
| 7887.429 | 0.2225758 | 0.2625092 |
| 7891.286 | 0.2200979 | 0.2582025 |
| 7895.143 | 0.2215625 | 0.2600926 |
| 7899 | 0.2285895 | 0.2696948 |
| 7902.856 | 0.2407317 | 0.2869526 |
| 7906.714 | 0.256078 | 0.309674 |
| 7910.57 | 0.2723869 | 0.3337449 |
| 7914.428 | 0.2859803 | 0.3542374 |
| 7918.284 | 0.2942302 | 0.3667992 |
| 7922.142 | 0.2973031 | 0.3705829 |
| 7925.998 | 0.2970157 | 0.3688856 |
| 7929.855 | 0.2955941 | 0.3652527 |
| 7933.712 | 0.2938991 | 0.3616449 |
| 7937.569 | 0.2913809 | 0.3568237 |
| 7941.426 | 0.2861694 | 0.3480504 |
| 7945.283 | 0.2774501 | 0.3338977 |
| 7949.14 | 0.2662539 | 0.3157236 |
| 7952.997 | 0.2540212 | 0.296478 |
| 7956.854 | 0.2423424 | 0.2781488 |
| 7960.711 | 0.2318843 | 0.2618834 |
| 7964.567 | 0.2230468 | 0.2484803 |
| 7968.425 | 0.2159803 | 0.2375455 |
| 7972.281 | 0.2104827 | 0.2289719 |
| 7976.139 | 0.2066893 | 0.2226466 |
| 7979.995 | 0.2044959 | 0.2184853 |
| 7983.853 | 0.2035417 | 0.2163847 |
| 7987.709 | 0.2037243 | 0.2160281 |
| 7991.566 | 0.2045076 | 0.216424 |
| 7995.423 | 0.2046981 | 0.2162843 |

| Wavenumber | First Embodiment | Prior Art |
| --- | --- | --- |
| 7999.28 | 0.203544 | 0.2140139 |
| 8003.137 | 0.200627 | 0.2093933 |
| 8006.994 | 0.1962947 | 0.2026216 |
| 8010.851 | 0.1911206 | 0.19527 |
| 8014.708 | 0.1862128 | 0.1885115 |
| 8018.564 | 0.182215 | 0.1828713 |
| 8022.422 | 0.1793168 | 0.1785976 |
| 8026.278 | 0.1772819 | 0.1754854 |
| 8030.136 | 0.1755273 | 0.1731484 |
| 8033.992 | 0.1736351 | 0.1709902 |
| 8037.85 | 0.1712621 | 0.1677315 |
| 8041.706 | 0.1681168 | 0.1634835 |
| 8045.563 | 0.1645813 | 0.1588488 |
| 8049.42 | 0.1609569 | 0.1542455 |
| 8053.277 | 0.1574073 | 0.1497729 |
| 8057.134 | 0.1542279 | 0.1457874 |
| 8060.991 | 0.1515128 | 0.1423924 |
| 8064.848 | 0.1491193 | 0.1394805 |
| 8068.705 | 0.1468828 | 0.1370824 |
| 8072.562 | 0.145015 | 0.1352221 |
| 8076.419 | 0.1434996 | 0.1340039 |
| 8080.275 | 0.1424088 | 0.1333937 |
| 8084.133 | 0.141884 | 0.1333309 |
| 8087.989 | 0.141774 | 0.1339445 |
| 8091.847 | 0.1421985 | 0.1351084 |
| 8095.703 | 0.1429884 | 0.1368488 |
| 8099.561 | 0.1438265 | 0.1390209 |
| 8103.417 | 0.1448854 | 0.141509 |
| 8107.274 | 0.1462358 | 0.1441038 |
| 8111.131 | 0.1473858 | 0.1466235 |
| 8114.988 | 0.1481756 | 0.1488052 |
| 8118.845 | 0.1483859 | 0.1504998 |
| 8122.702 | 0.1482302 | 0.1515467 |
| 8126.559 | 0.1474478 | 0.1518535 |
| 8130.416 | 0.1459654 | 0.1512627 |
| 8134.272 | 0.1440162 | 0.1498464 |
| 8138.13 | 0.1414625 | 0.1477316 |
| 8141.986 | 0.1384514 | 0.1450932 |
| 8145.844 | 0.135165 | 0.1419426 |
| 8149.7 | 0.1317911 | 0.1386496 |
| 8153.558 | 0.128514 | 0.1351413 |
| 8157.414 | 0.1251969 | 0.1317218 |
| 8161.271 | 0.1220665 | 0.1284174 |
| 8165.128 | 0.1191663 | 0.1255237 |
| 8168.985 | 0.1164434 | 0.1227698 |
| 8172.842 | 0.1140479 | 0.1202911 |
| 8176.699 | 0.1118671 | 0.118267 |
| 8180.556 | 0.110029 | 0.1166719 |
| 8184.413 | 0.1087185 | 0.1154408 |
| 8188.27 | 0.1077921 | 0.1147836 |
| 8192.127 | 0.1071621 | 0.1146744 |
| 8195.983 | 0.1069007 | 0.1149458 |
| 8199.841 | 0.1068427 | 0.1155496 |
| 8203.697 | 0.1072447 | 0.1165561 |
| 8207.555 | 0.1081284 | 0.1181959 |
| 8211.411 | 0.1092025 | 0.1205736 |
| 8215.269 | 0.1103264 | 0.1224736 |
| 8219.125 | 0.1103924 | 0.1229525 |
| 8222.982 | 0.1097863 | 0.1227398 |
| 8226.839 | 0.1095408 | 0.1227505 |
| 8230.696 | 0.1095479 | 0.1231369 |
| 8234.553 | 0.1092056 | 0.1230075 |
| 8238.41 | 0.1079045 | 0.1214861 |
| 8242.267 | 0.1058814 | 0.1190453 |
| 8246.124 | 0.1039836 | 0.1168208 |
| 8249.98 | 0.102521 | 0.1152001 |
| 8253.838 | 0.1015884 | 0.114084 |
| 8257.694 | 0.1009523 | 0.1134474 |
| 8261.552 | 0.1003005 | 0.1127949 |
| 8265.408 | 0.09923381 | 0.1114342 |
| 8269.266 | 0.09808514 | 0.1101157 |
| 8273.122 | 0.09751335 | 0.1095254 |
| 8276.979 | 0.0974704 | 0.1097651 |
| 8280.836 | 0.09782091 | 0.1104597 |
| 8284.693 | 0.09845495 | 0.1113697 |
| 8288.55 | 0.09891042 | 0.1122101 |
| 8292.407 | 0.09913485 | 0.1127544 |

| Wavenumber | First Embodiment | Prior Art |
|---|---|---|
| 8296.264 | 0.09968407 | 0.1135605 |
| 8300.121 | 0.1006335 | 0.1146149 |
| 8303.978 | 0.1015221 | 0.1160679 |
| 8307.835 | 0.1020376 | 0.1169834 |
| 8311.691 | 0.1017494 | 0.1165268 |
| 8315.549 | 0.1006646 | 0.1150765 |
| 8319.405 | 0.09959467 | 0.1138013 |
| 8323.263 | 0.09911118 | 0.1131857 |
| 8327.119 | 0.09900062 | 0.1133153 |
| 8330.977 | 0.0992009 | 0.1139663 |
| 8334.833 | 0.09986342 | 0.1150317 |
| 8338.69 | 0.1006438 | 0.1163774 |
| 8342.547 | 0.101653 | 0.1181531 |
| 8346.404 | 0.1031861 | 0.1203009 |
| 8350.261 | 0.1052458 | 0.1230883 |
| 8354.118 | 0.1076712 | 0.1264717 |
| 8357.975 | 0.1103519 | 0.1305739 |
| 8361.832 | 0.1133409 | 0.1350903 |
| 8365.688 | 0.1166161 | 0.1397325 |
| 8369.546 | 0.119533 | 0.1441502 |
| 8373.402 | 0.1217822 | 0.1477057 |
| 8377.26 | 0.1227776 | 0.1494877 |
| 8381.116 | 0.1225291 | 0.1495091 |
| 8384.974 | 0.12113 | 0.147916 |
| 8388.83 | 0.1189558 | 0.144969 |
| 8392.688 | 0.1163125 | 0.1411339 |
| 8396.544 | 0.1131045 | 0.1365883 |
| 8400.401 | 0.1093047 | 0.1312961 |
| 8404.258 | 0.1049701 | 0.1253608 |
| 8408.115 | 0.1005717 | 0.1191416 |
| 8411.972 | 0.09633461 | 0.113144 |
| 8415.829 | 0.09230892 | 0.1074849 |
| 8419.686 | 0.08874694 | 0.1024508 |
| 8423.543 | 0.08569793 | 0.0980474 |
| 8427.399 | 0.08302808 | 0.0940275 |
| 8431.257 | 0.08033232 | 0.0900648 |
| 8435.113 | 0.07771136 | 0.0862392 |
| 8438.971 | 0.07521249 | 0.0826097 |
| 8442.827 | 0.07303266 | 0.0796993 |
| 8446.685 | 0.07144295 | 0.0773014 |
| 8450.541 | 0.07001315 | 0.0752626 |
| 8454.398 | 0.06866677 | 0.0735226 |
| 8458.255 | 0.06737387 | 0.071916 |
| 8462.112 | 0.06603347 | 0.0703674 |
| 8465.969 | 0.06492907 | 0.0686328 |
| 8469.826 | 0.06343259 | 0.0664233 |
| 8473.683 | 0.06145187 | 0.0638667 |
| 8477.54 | 0.05949832 | 0.061189 |
| 8481.396 | 0.05785851 | 0.058911 |
| 8485.254 | 0.056508 | 0.0572359 |
| 8489.11 | 0.05544215 | 0.0559075 |
| 8492.968 | 0.05463411 | 0.054773 |
| 8496.824 | 0.05384059 | 0.0537401 |
| 8500.682 | 0.05288631 | 0.052369 |
| 8504.538 | 0.05180006 | 0.0509052 |
| 8508.396 | 0.050657 | 0.0496028 |
| 8512.252 | 0.04975219 | 0.0484568 |
| 8516.109 | 0.04906282 | 0.0474502 |
| 8519.966 | 0.04841991 | 0.0465446 |
| 8523.823 | 0.04775205 | 0.0458054 |
| 8527.68 | 0.04720326 | 0.045538 |
| 8531.537 | 0.04664916 | 0.0451654 |
| 8535.394 | 0.04596011 | 0.0443836 |
| 8539.251 | 0.04507327 | 0.0432776 |
| 8543.107 | 0.04399735 | 0.0420034 |
| 8546.965 | 0.04281853 | 0.0407823 |
| 8550.821 | 0.04175526 | 0.0398123 |
| 8554.679 | 0.04097691 | 0.0391626 |
| 8558.535 | 0.04046021 | 0.0388011 |
| 8562.393 | 0.04006071 | 0.0387753 |
| 8566.249 | 0.04014568 | 0.0392882 |
| 8570.106 | 0.04070279 | 0.0403608 |
| 8573.963 | 0.0413741 | 0.0418523 |
| 8577.82 | 0.04215509 | 0.0433598 |
| 8581.677 | 0.04257514 | 0.0443544 |
| 8585.534 | 0.04206403 | 0.0443233 |
| 8589.391 | 0.0406678 | 0.043326 |

| Wavenumber | First Embodiment | Prior Art |
|---|---|---|
| 8593.248 | 0.0389732 | 0.0414048 |
| 8597.104 | 0.03756198 | 0.0397382 |
| 8600.962 | 0.0364939 | 0.0389239 |
| 8604.818 | 0.03587851 | 0.0389415 |
| 8608.676 | 0.03606288 | 0.0393532 |
| 8612.532 | 0.03637171 | 0.0398988 |
| 8616.39 | 0.03585869 | 0.0397778 |
| 8620.246 | 0.03448644 | 0.038736 |
| 8624.104 | 0.03281076 | 0.0370982 |
| 8627.96 | 0.0312877 | 0.0355475 |
| 8631.817 | 0.02995473 | 0.0342853 |
| 8635.674 | 0.02889748 | 0.0334868 |
| 8639.531 | 0.02831587 | 0.0331182 |
| 8643.388 | 0.02837771 | 0.0333814 |
| 8647.245 | 0.02892508 | 0.0343565 |
| 8651.102 | 0.03054947 | 0.0370058 |
| 8654.959 | 0.03450327 | 0.0427417 |
| 8658.815 | 0.03869028 | 0.0489747 |
| 8662.673 | 0.03925629 | 0.0498416 |
| 8666.529 | 0.03898856 | 0.0499527 |
| 8670.387 | 0.038617 | 0.0497147 |
| 8674.243 | 0.0361326 | 0.0461714 |
| 8678.101 | 0.03461875 | 0.0440947 |
| 8681.957 | 0.03499673 | 0.0447592 |
| 8685.814 | 0.03620958 | 0.0465558 |
| 8689.671 | 0.03824627 | 0.0493881 |
| 8693.528 | 0.04140565 | 0.0538679 |
| 8697.385 | 0.04513405 | 0.0594056 |
| 8701.242 | 0.04922105 | 0.0650052 |
| 8705.099 | 0.05540366 | 0.0740508 |
| 8708.956 | 0.06006829 | 0.0814782 |
| 8712.813 | 0.05455963 | 0.0732309 |
| 8716.67 | 0.04389206 | 0.0578214 |
| 8720.526 | 0.03637384 | 0.0476515 |
| 8724.384 | 0.03254233 | 0.0423807 |
| 8728.24 | 0.03063625 | 0.0397276 |
| 8732.098 | 0.0297036 | 0.0383027 |
| 8735.954 | 0.02935001 | 0.0374292 |
| 8739.812 | 0.0291729 | 0.0372119 |
| 8743.669 | 0.02927342 | 0.0377092 |
| 8747.525 | 0.02950107 | 0.0381247 |
| 8751.382 | 0.02964139 | 0.0376712 |
| 8755.239 | 0.02906108 | 0.0367925 |
| 8759.096 | 0.02860942 | 0.036265 |
| 8762.953 | 0.02879661 | 0.0363999 |
| 8766.81 | 0.0296433 | 0.0372515 |
| 8770.667 | 0.03119351 | 0.0391067 |
| 8774.523 | 0.03350282 | 0.0423394 |
| 8778.381 | 0.03624541 | 0.0462339 |
| 8782.237 | 0.03962018 | 0.0508013 |
| 8786.095 | 0.04341128 | 0.0560419 |
| 8789.951 | 0.04539829 | 0.0586953 |
| 8793.809 | 0.04468539 | 0.0572496 |
| 8797.665 | 0.04294294 | 0.0542792 |
| 8801.522 | 0.04123655 | 0.0517691 |
| 8805.379 | 0.04094315 | 0.0510331 |
| 8809.236 | 0.04204067 | 0.0524471 |
| 8813.093 | 0.04467951 | 0.0560555 |
| 8816.95 | 0.04945555 | 0.0619959 |
| 8820.807 | 0.05459972 | 0.0691916 |
| 8824.664 | 0.05873273 | 0.0753385 |
| 8828.521 | 0.06155127 | 0.0792006 |
| 8832.378 | 0.06270151 | 0.080562 |
| 8836.234 | 0.06051356 | 0.0769354 |
| 8840.092 | 0.05467696 | 0.068397 |
| 8843.948 | 0.04824793 | 0.058992 |
| 8847.806 | 0.04335642 | 0.0516948 |
| 8851.662 | 0.04022981 | 0.0469242 |
| 8855.52 | 0.03870612 | 0.0440893 |
| 8859.376 | 0.03835694 | 0.0431998 |
| 8863.233 | 0.0387706 | 0.0440024 |
| 8867.09 | 0.0392863 | 0.0448787 |
| 8870.947 | 0.03910908 | 0.0443853 |
| 8874.804 | 0.03878365 | 0.0432988 |
| 8878.661 | 0.03836851 | 0.0423011 |
| 8882.518 | 0.03788348 | 0.0415797 |
| 8886.375 | 0.03788523 | 0.0416873 |

-continued

| Wavenumber | First Embodiment | Prior Art |
|---|---|---|
| 8890.231 | 0.03871429 | 0.0424628 |
| 8894.089 | 0.03882937 | 0.0422748 |
| 8897.945 | 0.03739865 | 0.0403725 |
| 8901.803 | 0.03552169 | 0.037506 |
| 8905.659 | 0.03404595 | 0.0350244 |
| 8909.517 | 0.03278999 | 0.033305 |
| 8913.373 | 0.03219931 | 0.0324208 |
| 8917.23 | 0.03222601 | 0.0322852 |
| 8921.087 | 0.03249785 | 0.0325268 |
| 8924.944 | 0.0329233 | 0.0330257 |
| 8928.801 | 0.03363897 | 0.0337113 |
| 8932.658 | 0.03437109 | 0.0343639 |
| 8936.515 | 0.03496985 | 0.0350099 |
| 8940.372 | 0.03538485 | 0.0354546 |
| 8944.229 | 0.03539617 | 0.0355378 |
| 8948.086 | 0.0352529 | 0.0351262 |
| 8951.942 | 0.03499408 | 0.0346599 |
| 8955.8 | 0.03456387 | 0.0340005 |
| 8959.656 | 0.03421672 | 0.0331635 |
| 8963.514 | 0.03403281 | 0.0324903 |
| 8967.37 | 0.033759 | 0.032207 |
| 8971.228 | 0.03345603 | 0.0320277 |
| 8975.084 | 0.03317447 | 0.0318981 |
| 8978.941 | 0.03307953 | 0.0321022 |
| 8982.798 | 0.03320667 | 0.0325597 |
| 8986.655 | 0.03317432 | 0.033056 |
| 8990.512 | 0.03314245 | 0.0333179 |
| 8994.369 | 0.03318287 | 0.0335158 |
| 8998.226 | 0.03323182 | 0.0341199 |
| 9002.083 | 0.03355676 | 0.0351072 |
| 9005.939 | 0.03414054 | 0.0363978 |
| 9009.797 | 0.0348347 | 0.0377068 |
| 9013.653 | 0.03551628 | 0.0389951 |
| 9017.511 | 0.03606145 | 0.0402973 |
| 9021.367 | 0.03635846 | 0.0414901 |
| 9025.225 | 0.03607401 | 0.0418829 |
| 9029.081 | 0.03562507 | 0.0415297 |
| 9032.938 | 0.03483678 | 0.040661 |
| 9036.795 | 0.033757 | 0.0396217 |
| 9040.652 | 0.03265765 | 0.0384696 |
| 9044.509 | 0.03163098 | 0.0375651 |
| 9048.366 | 0.03082862 | 0.0369939 |
| 9052.223 | 0.0302576 | 0.036354 |
| 9056.08 | 0.02967471 | 0.0356679 |
| 9059.937 | 0.02912709 | 0.0355782 |
| 9063.794 | 0.02890019 | 0.0357037 |
| 9067.65 | 0.02902117 | 0.0361155 |
| 9071.508 | 0.02979238 | 0.0374926 |
| 9075.364 | 0.03137371 | 0.0399598 |
| 9079.222 | 0.03357823 | 0.0432095 |
| 9083.078 | 0.03589553 | 0.0467394 |
| 9086.936 | 0.03771475 | 0.0493091 |
| 9090.792 | 0.03850858 | 0.0505021 |
| 9094.649 | 0.03825049 | 0.0505431 |
| 9098.506 | 0.0379781 | 0.0502041 |
| 9102.363 | 0.03796701 | 0.050078 |
| 9106.22 | 0.03831701 | 0.0505421 |
| 9110.077 | 0.03924143 | 0.0515636 |
| 9113.934 | 0.04042496 | 0.0528328 |
| 9117.791 | 0.04132193 | 0.0540984 |
| 9121.647 | 0.04178622 | 0.0548755 |
| 9125.505 | 0.04175131 | 0.0550721 |
| 9129.361 | 0.0412897 | 0.0544255 |
| 9133.219 | 0.04035386 | 0.0529374 |
| 9137.075 | 0.03902747 | 0.0507877 |
| 9140.933 | 0.03754131 | 0.0479547 |
| 9144.789 | 0.03579016 | 0.0449839 |
| 9148.646 | 0.03397171 | 0.0419621 |
| 9152.503 | 0.03274281 | 0.0391128 |
| 9156.36 | 0.03185022 | 0.0369612 |
| 9160.217 | 0.03119871 | 0.0358521 |
| 9164.074 | 0.03113641 | 0.0354254 |
| 9167.931 | 0.03161223 | 0.0358731 |
| 9171.788 | 0.03253935 | 0.0367349 |
| 9175.645 | 0.0336598 | 0.0379479 |
| 9179.502 | 0.03469844 | 0.0392475 |
| 9183.358 | 0.03593162 | 0.0404019 |

-continued

| Wavenumber | First Embodiment | Prior Art |
|---|---|---|
| 9187.216 | 0.03649995 | 0.0409628 |
| 9191.072 | 0.03655012 | 0.0405769 |
| 9194.93 | 0.03618872 | 0.0393995 |
| 9198.786 | 0.03560498 | 0.0379855 |
| 9202.644 | 0.03485449 | 0.0364497 |
| 9206.5 | 0.03430933 | 0.0352629 |
| 9210.357 | 0.0339871 | 0.0344976 |
| 9214.214 | 0.0337501 | 0.0338997 |
| 9218.071 | 0.03379847 | 0.0336016 |
| 9221.928 | 0.03392343 | 0.0334368 |
| 9225.785 | 0.03402297 | 0.0333385 |
| 9229.642 | 0.03417841 | 0.0332957 |
| 9233.499 | 0.03452311 | 0.0331441 |
| 9237.355 | 0.03439432 | 0.0328054 |
| 9241.213 | 0.03390436 | 0.0322378 |
| 9245.069 | 0.03365467 | 0.0314798 |
| 9248.927 | 0.03342463 | 0.0307142 |
| 9252.783 | 0.03326729 | 0.0302699 |
| 9256.641 | 0.03286105 | 0.0298009 |
| 9260.497 | 0.03259769 | 0.029593 |
| 9264.354 | 0.03229657 | 0.0297044 |
| 9268.211 | 0.03232251 | 0.0301033 |
| 9272.068 | 0.0328287 | 0.0307814 |
| 9275.925 | 0.03352968 | 0.0317764 |
| 9279.782 | 0.03455484 | 0.0329625 |
| 9283.639 | 0.03573498 | 0.0346766 |
| 9287.496 | 0.03710175 | 0.0368935 |
| 9291.353 | 0.03870164 | 0.0397118 |
| 9295.21 | 0.04067519 | 0.0429838 |
| 9299.066 | 0.04298119 | 0.0465924 |
| 9302.924 | 0.04513188 | 0.0500107 |
| 9306.78 | 0.04640964 | 0.0524499 |
| 9310.638 | 0.04678401 | 0.0538712 |
| 9314.494 | 0.04667848 | 0.0540431 |
| 9318.352 | 0.04598324 | 0.0531302 |
| 9322.208 | 0.0448838 | 0.0518037 |
| 9326.065 | 0.04414015 | 0.0506186 |
| 9329.922 | 0.04341242 | 0.0496729 |
| 9333.779 | 0.04242265 | 0.0485782 |
| 9337.636 | 0.0415442 | 0.0473848 |
| 9341.493 | 0.04068266 | 0.0465586 |
| 9345.35 | 0.0403197 | 0.0463175 |
| 9349.207 | 0.04091798 | 0.0471974 |
| 9353.063 | 0.042161 | 0.0492761 |
| 9356.921 | 0.04376584 | 0.0521793 |
| 9360.777 | 0.04623514 | 0.0560889 |
| 9364.635 | 0.04899079 | 0.0605137 |
| 9368.491 | 0.05131482 | 0.0645094 |
| 9372.349 | 0.05300911 | 0.0669851 |
| 9376.205 | 0.05365041 | 0.0680208 |
| 9380.063 | 0.05337985 | 0.0680274 |
| 9383.919 | 0.05311146 | 0.0677364 |
| 9387.776 | 0.05308205 | 0.067541 |
| 9391.633 | 0.05235989 | 0.067073 |
| 9395.49 | 0.05076706 | 0.0654563 |
| 9399.347 | 0.04871166 | 0.0622267 |
| 9403.204 | 0.0463869 | 0.0583826 |
| 9407.061 | 0.04402369 | 0.0549164 |
| 9410.918 | 0.04184601 | 0.052098 |
| 9414.774 | 0.04055169 | 0.0500114 |
| 9418.63 | 0.03997928 | 0.0485615 |
| 9422.488 | 0.03951615 | 0.0477827 |
| 9426.346 | 0.03887425 | 0.0470425 |
| 9430.202 | 0.03858198 | 0.0463867 |
| 9434.06 | 0.03823888 | 0.0453818 |
| 9437.916 | 0.03723806 | 0.0437519 |
| 9441.773 | 0.03628162 | 0.0417276 |
| 9445.63 | 0.03513883 | 0.0396895 |
| 9449.487 | 0.03389479 | 0.0378271 |
| 9453.344 | 0.03331512 | 0.0364489 |
| 9457.201 | 0.03293386 | 0.0351022 |
| 9461.058 | 0.03273566 | 0.0339019 |
| 9464.915 | 0.03256308 | 0.0332828 |
| 9468.771 | 0.03260858 | 0.0330977 |
| 9472.629 | 0.03250028 | 0.0330838 |
| 9476.485 | 0.03282693 | 0.0332919 |
| 9480.343 | 0.03301509 | 0.0334727 |

| Wavenumber | First Embodiment | Prior Art |
| --- | --- | --- |
| 9484.199 | 0.03308535 | 0.0333451 |
| 9488.057 | 0.03322342 | 0.0332132 |
| 9491.913 | 0.03300533 | 0.0330605 |
| 9495.771 | 0.03265271 | 0.0326221 |
| 9499.627 | 0.03223817 | 0.0320639 |
| 9503.484 | 0.03175834 | 0.0315016 |
| 9507.341 | 0.03151453 | 0.0310014 |
| 9511.198 | 0.03141679 | 0.0306066 |
| 9515.055 | 0.03133905 | 0.0303966 |
| 9518.912 | 0.03115977 | 0.0300501 |
| 9522.769 | 0.03128728 | 0.0297799 |
| 9526.626 | 0.03126273 | 0.0295136 |
| 9530.482 | 0.03133914 | 0.029229 |
| 9534.34 | 0.03132625 | 0.0287564 |
| 9538.196 | 0.03099744 | 0.0284224 |
| 9542.054 | 0.0307208 | 0.0282617 |
| 9545.91 | 0.03051849 | 0.0280786 |
| 9549.768 | 0.02955498 | 0.0276525 |
| 9553.624 | 0.02872458 | 0.0270593 |
| 9557.481 | 0.02798887 | 0.0262864 |
| 9561.338 | 0.02717537 | 0.0256047 |
| 9565.195 | 0.02627815 | 0.0247057 |
| 9569.052 | 0.02533995 | 0.023743 |
| 9572.909 | 0.02487335 | 0.0231347 |
| 9576.766 | 0.02456824 | 0.0229167 |
| 9580.623 | 0.0236783 | 0.0227417 |
| 9584.479 | 0.023035 | 0.0225177 |
| 9588.337 | 0.02236351 | 0.0224468 |
| 9592.193 | 0.02222247 | 0.0227634 |
| 9596.051 | 0.02243072 | 0.0230264 |
| 9599.907 | 0.02230704 | 0.0232086 |
| 9603.765 | 0.02247453 | 0.0236986 |
| 9607.621 | 0.0226074 | 0.0241849 |
| 9611.479 | 0.02227747 | 0.0244302 |
| 9615.335 | 0.02160178 | 0.024138 |
| 9619.192 | 0.02090573 | 0.0234369 |
| 9623.049 | 0.0200606 | 0.0224628 |
| 9626.906 | 0.01884921 | 0.0209236 |
| 9630.763 | 0.01750943 | 0.019543 |
| 9634.62 | 0.01656628 | 0.018383 |
| 9638.477 | 0.01587607 | 0.0171609 |
| 9642.334 | 0.01491062 | 0.0162139 |
| 9646.19 | 0.01396735 | 0.0152424 |
| 9650.048 | 0.01309511 | 0.0142362 |
| 9653.904 | 0.01257432 | 0.0137986 |
| 9657.762 | 0.01219544 | 0.0133201 |
| 9661.618 | 0.01175499 | 0.0126861 |
| 9665.476 | 0.01144315 | 0.0122314 |
| 9669.332 | 0.01162434 | 0.0121523 |
| 9673.189 | 0.011668 | 0.0121752 |
| 9677.046 | 0.01147901 | 0.0124633 |
| 9680.903 | 0.01158918 | 0.0130882 |
| 9684.76 | 0.01174843 | 0.0136827 |
| 9688.617 | 0.0117871 | 0.0137498 |
| 9692.474 | 0.0116621 | 0.013211 |
| 9696.331 | 0.01128553 | 0.0124917 |
| 9700.188 | 0.01076473 | 0.0118925 |
| 9704.045 | 0.01065767 | 0.0115032 |
| 9707.901 | 0.0106899 | 0.0110525 |
| 9711.759 | 0.01047066 | 0.0106543 |
| 9715.615 | 0.01002763 | 0.010282 |
| 9719.473 | 0.009509668 | 0.0097593 |
| 9723.329 | 0.009203076 | 0.009086 |
| 9727.187 | 0.008885086 | 0.0089827 |
| 9731.043 | 0.008784786 | 0.0090282 |
| 9734.9 | 0.008677199 | 0.0090019 |
| 9738.757 | 0.008269772 | 0.0088085 |
| 9742.614 | 0.00779064 | 0.008545 |
| 9746.471 | 0.007716581 | 0.0083104 |
| 9750.328 | 0.007612675 | 0.008145 |
| 9754.185 | 0.007302076 | 0.0080003 |
| 9758.042 | 0.007192388 | 0.0076435 |
| 9761.898 | 0.006930292 | 0.0071206 |
| 9765.756 | 0.006685346 | 0.0067036 |
| 9769.612 | 0.006431684 | 0.0063691 |
| 9773.47 | 0.006190971 | 0.005883 |
| 9777.326 | 0.006109774 | 0.0056775 |
| 9781.184 | 0.006056026 | 0.0054232 |
| 9785.04 | 0.00615862 | 0.0051487 |
| 9788.897 | 0.006071538 | 0.0049316 |
| 9792.754 | 0.006074399 | 0.0047035 |
| 9796.611 | 0.005877137 | 0.0045304 |
| 9800.468 | 0.005540729 | 0.004447 |
| 9804.325 | 0.005217388 | 0.0043706 |
| 9808.182 | 0.005187809 | 0.0042413 |
| 9812.039 | 0.004978999 | 0.0040918 |
| 9815.896 | 0.004711002 | 0.0037753 |
| 9819.753 | 0.004309326 | 0.0035005 |
| 9823.609 | 0.003874615 | 0.0035329 |
| 9827.467 | 0.003474474 | 0.003457 |
| 9831.323 | 0.003309697 | 0.0031646 |
| 9835.181 | 0.003467619 | 0.0034823 |
| 9839.037 | 0.003797308 | 0.0040712 |
| 9842.895 | 0.004433483 | 0.0049715 |
| 9846.751 | 0.005532324 | 0.0064522 |
| 9850.608 | 0.007085189 | 0.0087527 |
| 9854.465 | 0.008589312 | 0.011397 |
| 9858.322 | 0.009592101 | 0.013013 |
| 9862.179 | 0.009992063 | 0.0139165 |
| 9866.036 | 0.01059467 | 0.0149754 |
| 9869.893 | 0.01047933 | 0.0147564 |
| 9873.75 | 0.008805007 | 0.0127407 |
| 9877.606 | 0.0067693 | 0.0101617 |
| 9881.464 | 0.005325913 | 0.0081956 |
| 9885.32 | 0.004222423 | 0.0067195 |
| 9889.178 | 0.003370717 | 0.0053169 |
| 9893.034 | 0.002741337 | 0.0043655 |
| 9896.892 | 0.002509683 | 0.0036928 |
| 9900.748 | 0.002115771 | 0.0031149 |
| 9904.605 | 0.001425013 | 0.0030091 |
| 9908.462 | 0.00108853 | 0.0030901 |
| 9912.319 | 0.001473859 | 0.003612 |
| 9916.176 | 0.002023935 | 0.0046582 |
| 9920.033 | 0.003143772 | 0.0063916 |
| 9923.89 | 0.004780531 | 0.0092309 |
| 9927.747 | 0.005566955 | 0.0106108 |
| 9931.604 | 0.004799753 | 0.0087348 |
| 9935.461 | 0.003190294 | 0.0057635 |
| 9939.317 | 0.002341539 | 0.0039986 |
| 9943.175 | 0.00186874 | 0.0036183 |
| 9947.031 | 0.001708761 | 0.0033835 |
| 9950.889 | 0.001372948 | 0.0022829 |
| 9954.745 | 0.000769764 | 0.0010323 |
| 9958.603 | 0.000235722 | 0.0004905 |
| 9962.459 | 0.000123143 | 0.0001002 |
| 9966.316 | 0.000426009 | 0 |
| 9970.173 | 0.000970125 | 0.000556 |
| 9974.03 | 0.001483321 | 0.0014636 |
| 9977.887 | 0.001592726 | 0.0019106 |
| 9981.744 | 0.001608491 | 0.0020289 |
| 9985.601 | 0.002422139 | 0.0027767 |
| 9989.458 | 0.004358962 | 0.0049918 |
| 9993.314 | 0.00700368 | 0.0084845 |
| 9997.172 | 0.00859879 | 0.01019 |
| 10001.03 | 0.0075358 | 0.0078139 |

Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the invention. Substitutions of elements from one described embodiment to another are also fully intended and contemplated. The specific embodiments illustrated and described herein are for illustrative purposes only, and not limiting of the invention as set forth in the appended claims. Other embodiments will be evident to those of skill in the art. It should be understood that the foregoing description is provided for clarity only and is merely exemplary. The spirit and scope of the present invention are not limited to the above examples, but are encompassed by the following claims. All publications and patent applications cited above are incorporated by reference in their entirety for all purposes to the same extent as if each individual publication or patent application were specifically and individually indicated to be so incorporated by reference.

What is claimed is:

1. A diffuse reflectance apparatus comprising:
a light source configured to produce a beam of light;
a diffuse reflectance mirror having a reflective surface and an aperture through which the beam of light passes to a target, wherein the diffuse reflectance mirror is positioned relative to the target such that a substantial portion of specular reflection from a surface of the target passes back through the aperture and the reflective surface collects a substantial portion of scattered light from the target and forms a second beam;
a detector configured to produce a signal in response to the second beam; and
an optical assembly positioned to direct the second beam from the diffuse reflectance mirror to the detector, wherein the optical assembly comprises:
a first flat mirror;
a second flat mirror; and
a concave ellipsoidal mirror,
wherein the first flat mirror is positioned to reflect the second beam comprising the scattered light from the concave mirror to the second flat mirror,
wherein the second flat mirror is positioned to reflect the second beam comprising the scattered light from the first flat mirror to the concave ellipsoidal mirror, and
wherein the concave ellipsoidal mirror is positioned to reflect the second beam comprising the scattered light from the second flat mirror to the detector.

2. The apparatus of claim 1 wherein the aperture is positioned in the center of the mirror.

3. The apparatus of claim 1 wherein the aperture is substantially ellipsoidal.

4. The apparatus of claim 1 wherein the aperture comprises a wall having a substantially black color.

5. The apparatus of claim 1 wherein the target includes a sample.

6. The apparatus of claim 5 wherein the target includes a window, wherein the beam of light passes through the window to interact with the sample.

7. The apparatus of claim 1, wherein the diffuse reflectance mirror is concave.

8. The apparatus of claim 7 wherein the concave diffuse reflectance mirror is ellipsoidal.

9. The apparatus of claim 7, wherein the concave diffuse reflectance mirror has a numerical aperture of about 0.5.

10. The apparatus of claim 7, wherein the second beam is a converging beam formed by the concave diffuse reflectance mirror.

11. The apparatus of claim 1, wherein the diffuse reflectance mirror is flat.

12. The apparatus of claim 1, wherein the diffuse reflectance mirror is formed of plastic.

13. The apparatus of claim 1, wherein the diffuse reflectance mirror is formed of diamond turned and polished aluminum.

14. The apparatus of claim 1, further comprising a first optical assembly positioned to reflect the beam of light through the aperture to the target.

15. The apparatus of claim 14, further comprising a baffle positioned between the first optical assembly and the diffuse reflectance mirror.

16. The apparatus of claim 15, wherein the baffle includes an aperture extending therethrough.

17. The apparatus of claim 16, wherein the aperture is configured to control a diameter of the light beam at the target.

18. The apparatus of claim 14, wherein the first optical assembly comprises:
a concave parabolic mirror; and
a flat mirror,
wherein the concave parabolic mirror is positioned to reflect the light beam from the light source to the flat mirror, and
wherein the flat mirror is positioned to reflect the light beam from the concave parabolic mirror through the aperture in the diffuse reflectance mirror.

19. The apparatus of claim 1, wherein a distance between the first and second flat mirror is selected such that a focus of the second beam comprising the scattered light is coincident with a focal point on the second flat mirror and that the second beam comprising the scattered light is focused at the detector.

* * * * *